US012804001B2

(12) United States Patent
Bleeker et al.

(10) Patent No.: US 12,804,001 B2
(45) Date of Patent: Nov. 17, 2026

(54) INTENT DETERMINATION AND CONTROL IN AN ENTERPRISE DATA MANAGEMENT AND MONITORING SYSTEM

(71) Applicant: SUREPATH AI, INC., Denver, CO (US)

(72) Inventors: Casey Bleeker, Denver, CO (US); Randall Birdsall, Laurel, MD (US)

(73) Assignee: SUREPATH AI, INC., Denver, CO (US)

( * ) Notice: Subject to any disclaimer, the term of this patent is extended or adjusted under 35 U.S.C. 154(b) by 0 days.

(21) Appl. No.: 18/810,284

(22) Filed: Aug. 20, 2024

(65) Prior Publication Data

US 2026/0058967 A1 Feb. 26, 2026

(51) Int. Cl.
*H04L 9/40* (2022.01)

(52) U.S. Cl.
CPC ...... *H04L 63/1425* (2013.01); *H04L 63/0227* (2013.01); *H04L 63/20* (2013.01)

(58) Field of Classification Search
None
See application file for complete search history.

(56) References Cited

U.S. PATENT DOCUMENTS 8,234,705 B1 7/2012 Roskind et al.
8,775,275 B1 * 7/2014 Pope .................. G06Q 30/0255 705/26.7
9,609,025 B1 3/2017 Betzler et al.
11,363,050 B1 6/2022 Srinivasan
2010/0332481 A1 12/2010 Rowney
2014/0007222 A1 1/2014 Qureshi et al.
2014/0090058 A1 * 3/2014 Ward .................. H04L 63/1433 726/23
2015/0227696 A1 8/2015 Borden
2016/0342738 A1 11/2016 Stalling et al.
2016/0381054 A1 12/2016 Agaian et al.
2017/0351875 A1 12/2017 Rotem et al.
2018/0278651 A1 9/2018 Narayanaswamy et al.
2019/0245894 A1 * 8/2019 Epple .................. H04L 63/1483
2019/0372937 A1 12/2019 Song et al.
2020/0007548 A1 1/2020 Sanghavi et al.
2020/0259793 A1 8/2020 Pangeni et al.
2020/0274895 A1 8/2020 Kulaga et al.
2020/0280565 A1 9/2020 Rogynskyy et al.
2021/0192651 A1 6/2021 Groth et al.
(Continued)

*Primary Examiner* — Farid Homayounmehr
*Assistant Examiner* — Suman Debnath
(74) *Attorney, Agent, or Firm* — Troutman Pepper Locke LLP

(57) ABSTRACT

A system may include a network communication interface configured to receive network traffic, a processing unit, and a memory unit storing instructions for various engines that are executable by the processing unit. The various engines include a data policy enforcement engine that includes an intent detection engine configured to receive context data and content data relating to the network traffic and generate an intent indexer for the network traffic based on the context data and the content data. The intent indexer documents an operation request and a subject of the operation request that are connected to the network traffic. The various engines also include an intent policy control engine configured to administer aspects of the network traffic based on the intent indexer and the context data.

18 Claims, 23 Drawing Sheets

(56) References Cited

U.S. PATENT DOCUMENTS

| | | | |
|---|---|---|---|
| 2021/0194888 | A1 | 6/2021 | Bhaskar S et al. |
| 2023/0027628 | A1* | 1/2023 | Wu ..................... G06F 16/9038 |
| 2023/0142339 | A1 | 5/2023 | Getselevich et al. |
| 2023/0252028 | A1 | 8/2023 | Park et al. |
| 2023/0274091 | A1 | 8/2023 | Gao |
| 2024/0104103 | A1* | 3/2024 | Sommerlade ........... G06F 40/30 |
| 2024/0419465 | A1 | 12/2024 | Riscutia et al. |
| 2024/0428008 | A1 | 12/2024 | Abraham et al. |
| 2025/0005050 | A1 | 1/2025 | Krishnan et al. |
| 2026/0029910 | A1 | 1/2026 | Sedouram et al. |

* cited by examiner

538

Generate a summary of year-to-date manufacturing output for internal use, based on the raw data below:

REPORT: Jane Doe
Role: Manufacturing Team Lead

Monthly Units Produced 2024:
January: 373
February: 326
March: 391
April: 403

Notes:
- Production capacity will increase by 100/mo beginning June 2024
- We expect further increase of output by 10% August 2024

FIG. 5E

INTENT DETERMINATION AND CONTROL IN AN ENTERPRISE DATA MANAGEMENT AND MONITORING SYSTEM

FIELD

The present disclosure relates generally to enterprise network systems and more particularly to determining user interaction intent and performing control operations related thereto in enterprise data management and monitoring systems.

BACKGROUND

Managing risks to enterprise data in relation to network traffic from web browsers, native software applications, operating system components, network services, and/or web services utilized by enterprise users is an ongoing concern. Typical methods for managing these risks have focused on training users to properly manage the data use in relation to external network services, controlling access to enterprise data, and/or blocking client devices and users from accessing particular services or websites that may pose a risk of disclosing or corrupting the enterprise data. However, these methods can be ineffective at prevention and/or overly restrictive when blocking access to generally valuable network services because these methods do not consider the entire context of the underlying interaction. In particular, the existing access blocking and user training data control methods have proved to be insufficient to handle the rise of new artificial intelligence (AI) and machine learning (ML) network services that can process large volumes of existing enterprise data and/or user input to generate new enterprise data. Some of existing data control methods that use full scale access blocking solutions may make such determinations in relation to contextual data such as a user's defined role in an enterprise. However, these control methods lack a process for making finer gauge determinations about user intentions and performing data control operations based on such determinations.

The generative aspects of the AI and ML network services as well services provided by other external network services when used properly provide valuable improvements to enterprise productivity and operation while limiting the risk of unintended disclosure or corruption of protected enterprise data. Therefore, a new approach is needed that, where possible, identifies enterprise users' intention for interactions with network services and automatically conforms those interactions into proper approved uses by considering the full context and determined intention of the interactions with the network services.

SUMMARY

In some aspects, the techniques described herein relate to an Enterprise Data Management and Monitoring system, the system including: a network communication interface configured to receive network traffic; a processing unit; and a memory unit storing instructions for various engines that are executable by the processing unit, the various engines including a data policy enforcement engine that includes: an intent detection engine configured to: receive context data and content data relating to the network traffic; and generate an intent indexer for the network traffic based on the context data and the content data, the intent indexer documenting an operation request and a subject of the operation request that are connected to the network traffic; and an intent policy control engine configured to administer aspects of the network traffic based on the intent indexer and the context data.

In some aspects, the techniques described herein relate to a computer-implemented method of administering aspects of network traffic, the method including: receiving network traffic via a network communication interface; receiving context data and content data relating to the network traffic; generating an intent indexer for the network traffic based on the context data and the content data, the intent indexer documenting an operation request and a subject of the operation request that are connected to the network traffic; and administering aspects of the network traffic based on the intent indexer and the context data.

In some aspects, the techniques described herein relate to a tangible, non-transitory computer-readable medium storing instructions for providing alerts, that, when executed by one or more processors of a computer system, cause the computer system to: receive network traffic via a network communication interface; receive context data and content data relating to the network traffic; generate an intent indexer for the network traffic based on the context data and the content data, the intent indexer documenting an operation request and a subject of the operation request that are connected to the network traffic; and administer aspects of the network traffic based on the intent indexer and the context data.

BRIEF DESCRIPTION OF THE DRAWINGS

FIG. 5E depicts a redacted request to the network service according to some embodiments.

DETAILED DESCRIPTION

Figure 1A:
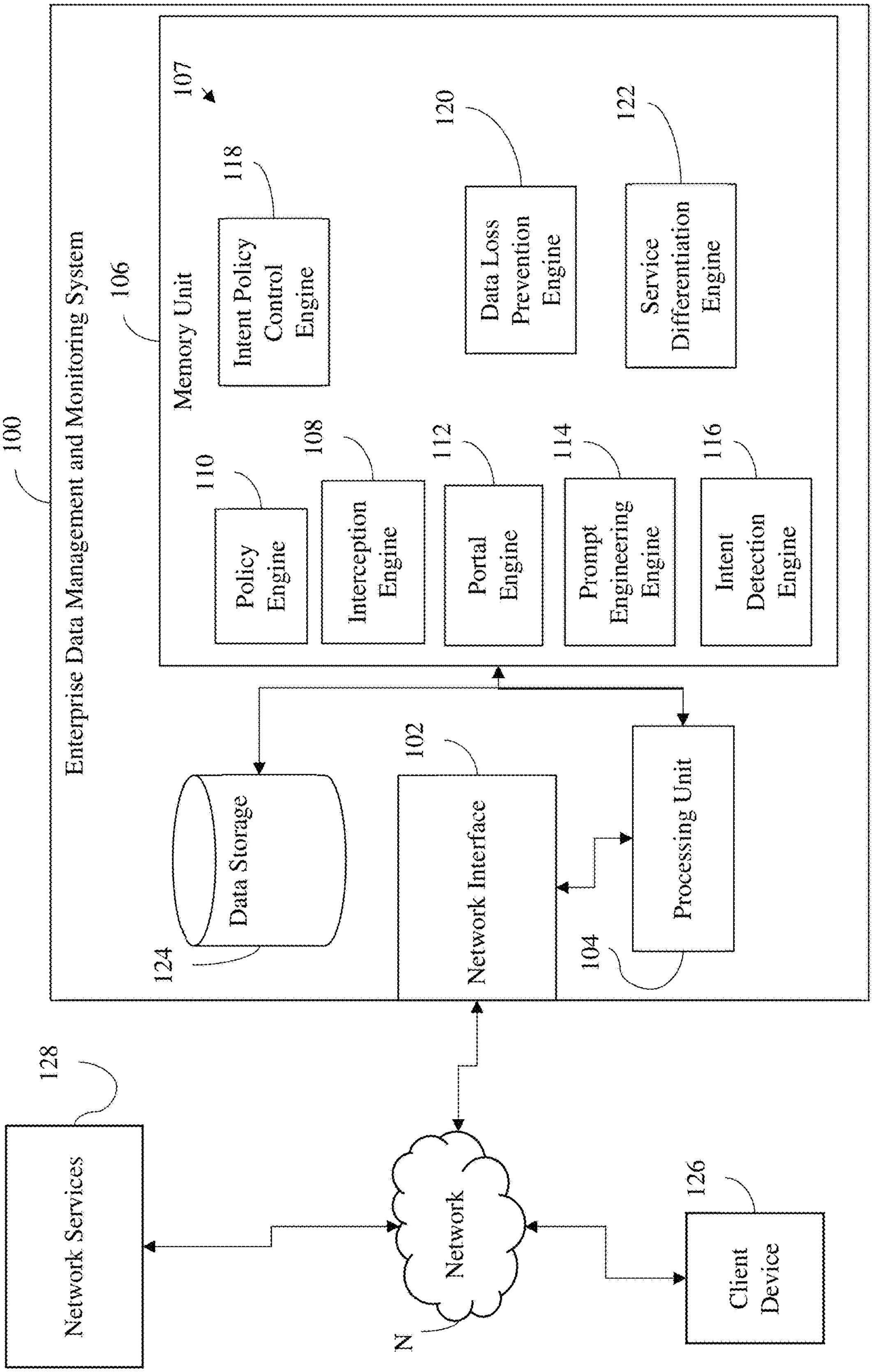
FIG. 1A is a block diagram of an enterprise data management and monitoring system according to some embodiments.

FIG. 1A is a block diagram of an enterprise data management and monitoring system 100. The system 100 includes a network communication interface 102 for communicating with a network N, a processing unit 104, and a memory unit 106. The network N may include various data transmission network topologies known in the art such as a local area network (LAN), a wide area network (WAN), combinations thereof, etc.

Processing unit 104 includes one or more processors, each of which may be a programmable microprocessor or the like that executes software instructions stored in memory unit 106 to execute some or all of the functions of the enterprise data management and monitoring system 100 as described herein. Processing unit 104 may include one or more graphics processing units (GPUs) and/or one or more central processing units (CPUs), for example. Alternatively, or in addition, one or more processors in processing unit 104 may be other types of processors (e.g., application-specific integrated circuits (ASICs), field-programmable gate arrays (FPGAs), etc.), and some of the functionality of the enterprise data management and monitoring system 100 as described herein may instead be implemented in hardware.

Memory unit 106 may include one or more volatile and/or non-volatile memories. Any suitable memory type or types may be included in memory unit 106, such as read-only memory (ROM) and/or random access memory (RAM), flash memory, a solid-state drive (SSD), a hard disk drive (HDD), and so on. Collectively, memory unit 106 may store one or more software applications, the data received/used by those applications, and the data output/generated by those applications.

In particular, memory unit 106 stores the software instructions of various engines 107 that, when executed by processing unit 104, perform various functions for the purpose managing and monitoring enterprise data being used and generated by enterprise associated client devices. As used herein "enterprise data" may include electronic documents, images, metadata, computer code, AI parameters, or other similar electronically readable data that is under the control of and/or generated by an enterprise. An "enterprise" as used herein is a company, corporation, or similar entity that employs the enterprise data management and monitoring system 100. Specifically, in the example embodiment of FIG. 1A, memory unit 106 includes an interception engine 108, a policy engine 110, a portal engine 112, a prompt engineering engine 114, an intent detection engine 116, an intent policy control engine 118, a data loss prevention engine 120, and a service differentiation engine 122. As shown in FIG. 1A the enterprise data management and monitoring system 100 can also include a data storage system 124. The data storage system 124 can be one or multiple elements that are a part or portion of the memory unit 106 and/or can be external devices accessible by the processing unit 104 via wired or wireless methods known in the art.

In general, the enterprise data management and monitoring system 100 is configured to manage, monitor, and/or modify the flow of data between a client device 126 and network services 128. The network services 128 may include services hosted by the enterprise that operates the enterprise data management and monitoring system 100 and/or externally hosted public or private network services as described herein. The network services 128 may be accessed via a web browser, dedicated mobile or desktop software application, operating system components, network hardware or software, etc. The enterprise data management and monitoring system 100 is configured to automatically conform an enterprise user intended interaction from the client device 126 with one of the network services 128 into a proper and approved use where possible by, for example, identifying and understanding the full context of the intended interaction. To facilitate this process, the interception engine 108 is configured to intercept outbound network traffic from the client device 126 to the network services 128 and inbound network traffic from the network services 128 back to the client device 126 via the network communication interface 102. The policy engine 110 and other ones of the various engines 107 are configured to perform various management and monitoring operations with respect to the inbound and outbound network traffic either directly or by using other ones of the various engines 107 as described herein. The various management and monitoring operations are described in more detail below, but in general include actions that control the interaction of the client device 126 with the network services 128, identify or generate data relevant for controlling the interaction, identify or generate data for retrospective analysis of the interaction, and/or identify or generate date for prospectively improving future interactions.

In some embodiments, the management of the inbound network traffic and the outbound network traffic is facilitated in part by the portal engine 112. In particular, the portal engine 112 may be configured to provide a graphical interface for display and interaction on the client device 126. The graphical interface can facilitate user input of the contents of the outbound network traffic and display the contents of the recipient specific data. The portal engine 112 may be configured to provide the graphical interface as a web page accessible through an internet browser on the client device, a window display of an application running locally on the client device, and/or other similar methods known in the art. The portal engine 112 may also be configured to enforce various security measures such as authenticating the client device 126 and providing authentication credentials to the network services 128 either individually or in conjunction with other engines of the enterprise data management and monitoring system 100. In some embodiments, the policy engine 110 and/or another one of the engines 107 of the enterprise data management and monitoring system 100 can be configured to direct the client device 126 to the web page, application, etc. facilitated by the portal engine 112 when the outbound network traffic is directed to one of the network services 128 in an unapproved manner. For example, the client device 126 can be redirected when the one of the network services 128 is not one of a set of approved network services stored in the data storage system 124, is being accessed with personal user credentials rather than enterprise level credentials, and/or when other preconfigured trigger conditions are met.

However, in some embodiments, the enterprise data management and monitoring system 100 may be configured to utilize an interface provided by one of the network services 128 to receive the outbound network traffic and display the recipient specific dataset to the client device 126. In these embodiments, the client device 126 is presented with an interface of one of the network services 128 or a different intended network service rather than the interface generated by the portal engine 112. In embodiments where the interface of an intended network service is displayed, the enterprise data management and monitoring system 100 can inject datasets generated from other ones of the network service 128 therein such that the data will appear to the user of the client device 126 to be results provided by the intended network service when in actuality the contents of the dataset are generated from a different one of the network services 128.

Figure 1B:
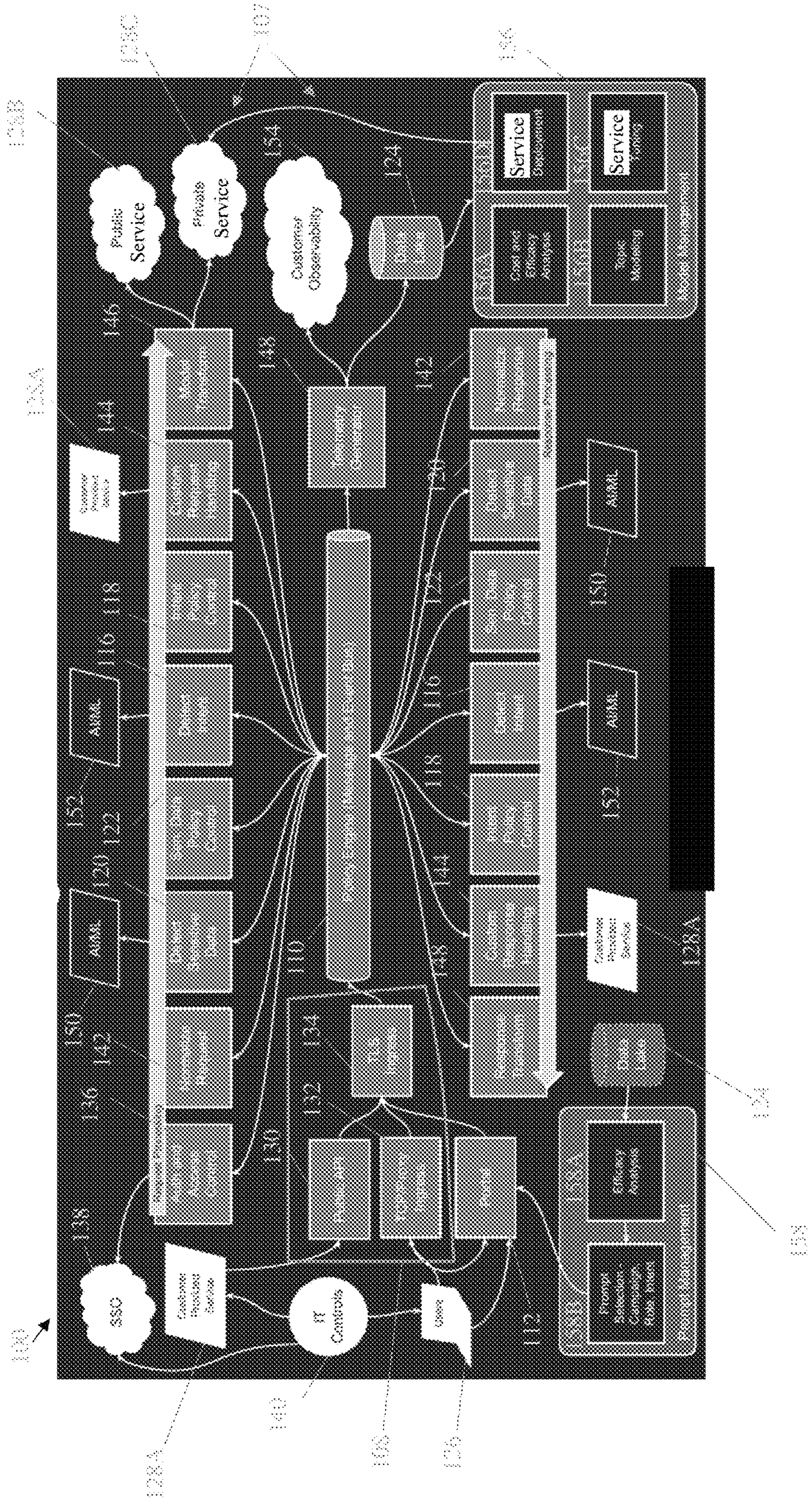
FIG. 1B is a block diagram showing additional details of the Enterprise Data Management and Monitoring system of FIG. 1A according to some embodiments.

As shown in FIG. 1B, the enterprise data management and monitoring system 100 can include additional engines and sub engines of the various engines 107 that are configured to perform additional tasks as described in more detail herein.

These additional engines and sub engines can include a public application programming interface (API) 130, a TCP/Proxy Ingress 132, a TLS Ingress 134 that together make up the interception engine 108 and are together configured to direct outbound traffic from the client device 126 and inbound network traffic from the network services 128 to the policy engine 110. The public API 130 is like APIs known in the art and documents the specific manner mechanisms, etc., that external devices, software, etc. can use to interface with the enterprise data management and monitoring system 100. The TCP/Proxy Ingress 132 is configured to provide forward and reverse proxy functionality for the client device 126 and the TLS Ingress 134 is configured to provide a security layer for network traffic flowing into and out of the enterprise data management and monitoring system 100.

As shown in FIG. 1B, the network services 128 may include a variety of different services. These services include, but are not limited to, customer provided network services 128A, publicly available services 128B, and/or private services 128C. The publicly available services 128B may include pretrained AI models such as convolutional neural network (CNN) models, transformer models (large language models, large multi-modal models, etc.), recurrent/recursive neural network (RNN) models, sorting/clustering models, combinations thereof, etc. managed and controlled by third parties external to an enterprise with which the client device 126 is associated. In contrast, the private services 128C may include AI models of the various types described herein and known in the art that are under the control of the enterprise. Furthermore, the private services 128C may include AI models with parameter values trained using only data controlled or approved by the enterprise or may include variations of publicly available services 128B with parameter values that are further tuned or trained using the data controlled or approved by the enterprise. It should be appreciated that the network services 128 may include various non AI or ML related services that can pose a risk to enterprise data such as public email services, open source code repositories, business process tools, artifact and file sharing services, cloud computing services, social media platforms, financial services, backup services, e-commerce platforms, instant messaging, productivity and collaborative tools, etc.

In the configuration of the enterprise data management and monitoring system 100 shown in FIG. 1B, some of the various engines 107 are configured as sub-engines of the policy engine 110. The policy engine 110 may utilize the sub engines to perform the various management and monitoring operations of the enterprise data management and monitoring system 100 on both requests (e.g., outbound traffic from the client device 126) and responses (e.g., inbound network traffic from the network services 128).

The sub-engines of the policy engine 110 include the intent detection engine 116, the intent policy control engine 118, the data loss prevention engine 120, and the service differentiation engine 122 shown in FIG. 1A, which are described in more detail below. The sub-engines of the policy engine 110 can also include additional engines of the various engines 107. For example, an authentication and access control module 136 may be configured to manage respective log-in credentials for a set of approved ones of the network services 128 that are stored in the data storage system 124. The authentication and access control module 136 may interface with single-sign-on (SSO) systems 138 and other IT control systems 140 for accessing the network services 128 including the customer provided network services 128A, the publicly available services 128B, and the private services 128C.

The sub-engines of the policy engine 110 as shown in FIG. 1B also include a normalization engine 142, a custom request handling engine 144 for routing traffic to the customer provided network services 128A, and a transformation engine 146, and a telemetry generator 148. The custom request handling engine 144 is configured to route network traffic through the enterprise data management and monitoring system 100 into the customer provided network services 128A. In particular, the custom request handling engine 144 allows the user of the enterprise data management and monitoring system 100 to capture, trigger internal process from, modify, or stop further processing based on the user's own internal logic rules that the user may or may not want to share with the enterprise data management and monitoring system 100. The normalization engine 142 and the transformation engine 146 are described in more detail below with respect to FIG. 2B. The policy engine 110 may also include AI/ML models 150 and 152 utilized by the data loss prevention engine 120 and intent detection engine 116, respectively.

The telemetry generator 148 generates metadata and other similar data elements that document operation of the enterprise data management and monitoring system 100 over time (e.g., details of what the enterprise data management and monitoring system 100 does, is asked to do, refrains from doing, etc.). The metadata and other similar data elements are saved in the data storage system 124 and can be accessed by approved users via an observation platform 154.

As shown in FIG. 1B, the data storage system 124 may comprise a data lake, which houses model management data/tool 156 relating to the private services 128C and prompt management data/tools 158.

The model management data/tool 156 includes a cost and efficacy analysis tool 156A, a topic modeling tool 156B, a service tuning tool 156C, and a service deployment tool 156D. The cost and efficacy analysis tool 156A is configured to generate and output metrics relating to the cost and efficacy of the private services 128C. The topic modeling tool 156B is configured to identify patterns in data sets used in conjunction with the private services 128C. The service tuning tool 156C is configured to further train or tune the parameter values of the private services 128C (e.g., to initially tune versions AI model versions of the private services 128C based on the publicly available services 128B and/or to revise the services 128C in response to updated data). The service deployment tool 156D is configured to manage deployment of the private services 128C.

The prompt management data/tools 158 includes a prompt efficacy analysis tool 158A and a prompt selection tool 158B. The prompt efficacy analysis tool 158A is configured to provide data analysis of the suitability of AI/ML input prompts to achieve a specified goal. The prompt selection tool 158B is configured to assist a user of the client device 126 in selecting and/or generating better prompts for input into the publicly available services 128B and/or the private services 128C either alone or in conjunction with the prompt engineering engine 114 as described herein.

Further details regarding operation of the various engines 107 are described below.

Interception and Policy Engines

Operation of the interception engine 108 and the policy engine 110 are described in more detail with reference now to FIG. 2A. In general, the interception engine 108 intercepts the web traffic between the client device 126 and the network services 128 and the policy engine 110 modifies or otherwise manipulates some or all elements of the web traffic to automatically conform the interaction between the client device 126 and the network services 128 into a proper and approved use. While not pictured in FIG. 2A, it should be appreciated that the policy engine 110 and the interception engine 108 comprise instructions stored on the memory unit 106 that are executed by the processing unit 104 as described elsewhere herein.

Figure 2A:
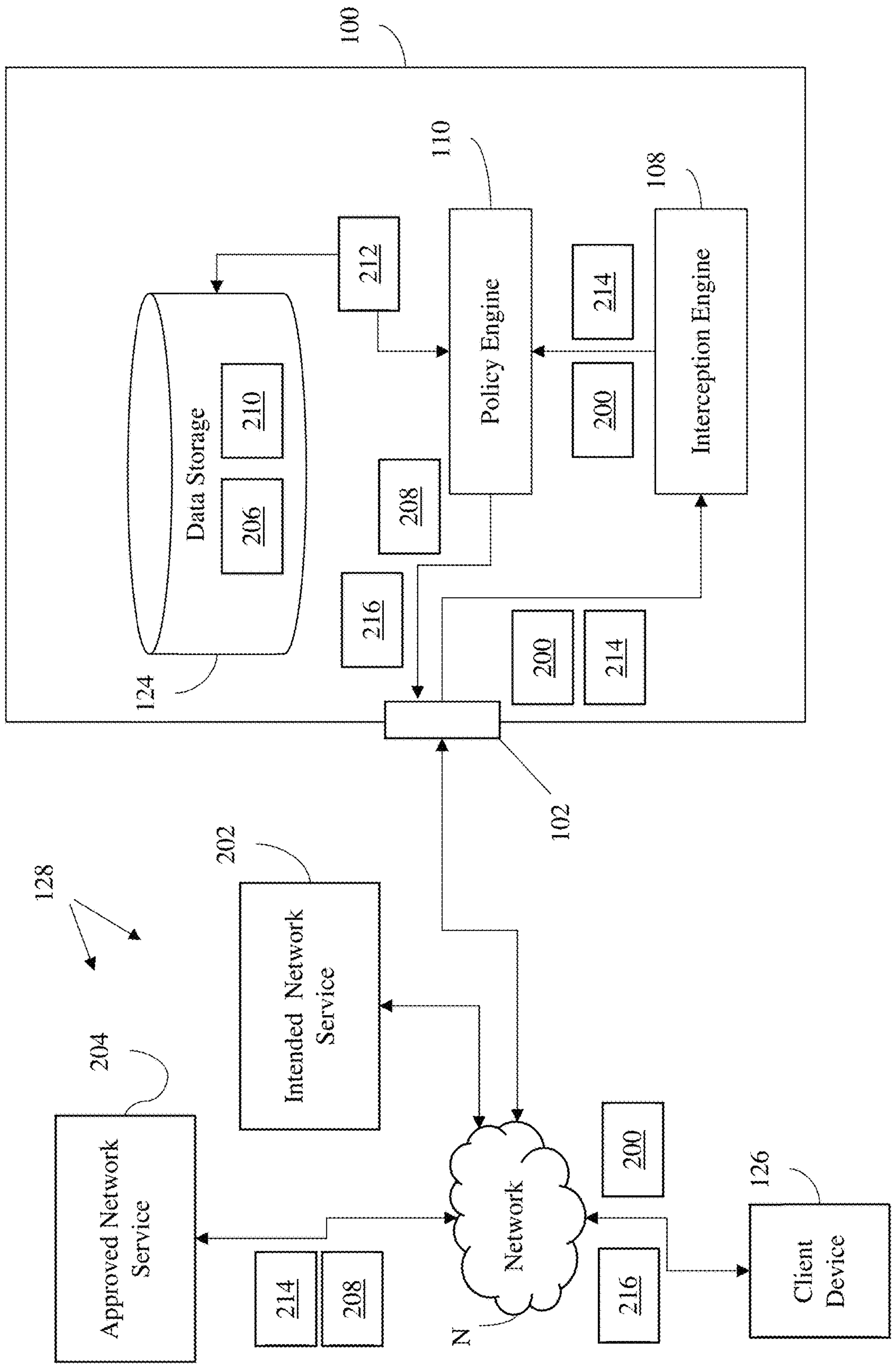
FIG. 2A is a block diagram showing details of network traffic routing by the Enterprise Data Management and Monitoring system of FIG. 1A according to some embodiments.

As shown in FIG. 2A, the interception engine 108 is configured to intercept outbound network traffic 200 from the client device 126 via the network communication interface 102. The policy engine 110 is configured to receive the outbound network traffic 200 from the interception engine 108 and parse the outbound network traffic 200 to determine an intended network service 202 to which the outbound network traffic 200 is directed by the client device 126. The policy engine 110 is also be configured to select an approved network service 204 from a set of approved network services 206 stored in the data storage system 124. This selection may be based on the intended network service 202 and contents of the outbound network traffic 200. In particular, the policy engine 110 selects the approved network service 204 to be a one of set of approved network services 206 that can provide a similar result to that of the intended network service 202. For example, where the intended network service 202 is a generative AI model that is not itself included in the set of approved network services 206, the approved network service 204 will be a different generative AI model that is listed in the set of approved network services 206. However, embodiments where the intended network service 202 is on the set of approved network services 206, the approved network service 204 may be the intended network service 202.

It should also be appreciated that the set of approved network services 206 may include both a list of approved services and a corresponding manner in which those services are allowed to be accessed (e.g., accessed using enterprise provided account details rather than private user account details). In these embodiments, the approved network service 204 may comprise the same underlying service as the intended network service 202 but accessed through different accounts or methods. For example, where the intended network service 202 is a generative AI platform included in the set of approved network services 206 that the client device 126 attempts to interact with using a private log-in credentials, the approved network service 204 can be the same generative AI platform but accessed using account details specific to the enterprise. Furthermore, the policy engine 110 can force the client device 126 to access the generative AI service that comprises the approved network service 204 using interface provided by the portal engine 112.

Furthermore, the policy engine 110 is configured to generate a destination specific dataset 208 based on the contents of the outbound network traffic 200 and a first data processing schema 210. The first data processing schema 210 is associated with the approved network service 204 and is stored in the data storage system 124. As described in more detail below, destination specific dataset 208 ensures that the data contents originally provided in the outbound network traffic 200 and directed to the intended network service 202 are appropriate for the approved network service 204.

The policy engine 110 is also configured to transmit the destination specific dataset 208 to the approved network service 204 via the network communication interface 102 and the network N and to store network session data 212 in the data storage system 124. The network session data 212 documents the client device 126, the approved network service 204, the intended network service 202, an indication of the contents of the outbound network traffic, and the destination specific dataset. As described herein, saving and utilizing the network session data 212 enables the policy engine 110 and other ones of the various engines 107 to have a full context awareness of the interaction between the client device 126 and the approved network service 204.

For purposes of managing responses from the approved network service 204, the interception engine 108 is further configured to intercept inbound network traffic 214 from the approved network service 204 via the network communication interface 102.

Furthermore, the policy engine 110 is configured to receive the inbound network traffic 214 from the interception engine 108 and recall the network session data 212 from the data storage system 124 based on contents of the inbound network traffic 214. The policy engine 110 is also configured to generate a recipient specific dataset 216 based on the contents of the inbound network traffic 214, the network session data 212, and the first data processing schema 210 that is associated with the approved network service 204. The recipient specific dataset 216 ensures that the data ultimately provided back to the client device 126 conforms to the user's expectations when originally attempting to interact with the intended network service 202.

Further still, the policy engine 110 may be configured to transmit the recipient specific dataset 216 to the client device 126 via the network communication interface 102 and update the network session data 212 to include an indication of the contents of the inbound network traffic 214.

Figure 2B:
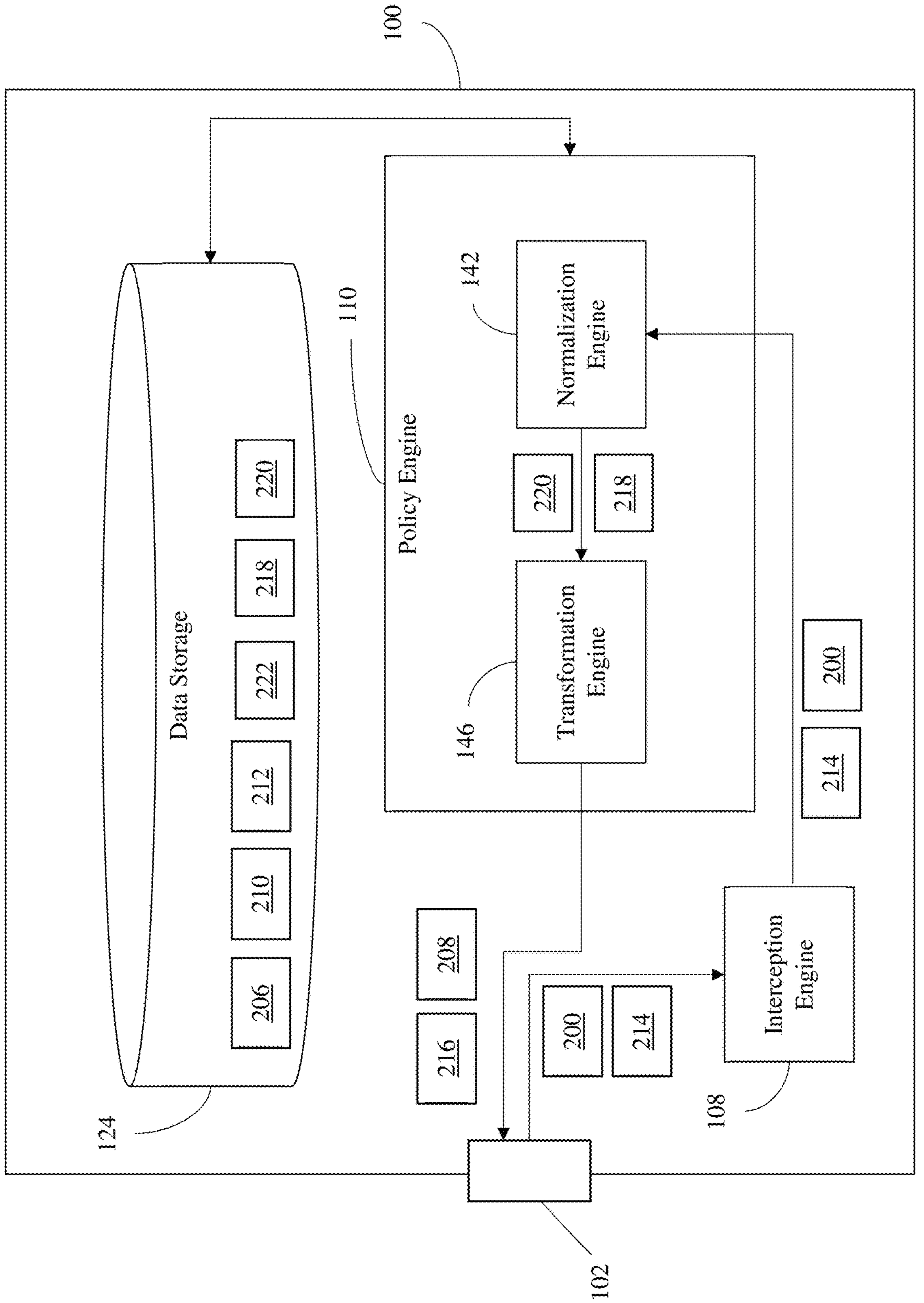
FIG. 2B is a block diagram showing details of a policy engine for the enterprise data management and monitoring system of FIGS. 1A and 2A according to some embodiments.

Turning now to FIG. 2B, the normalization engine 142 and the transformation engine 146 may be configured to generate the destination specific dataset 208 and the recipient specific dataset 216 at the direction of the policy engine 110. In general, the normalization engine 142 converts data flowing into the enterprise data management and monitoring system 100 that is specifically formatted for the client device 126 and/or the network services 128 into a normalized format that can be understood and used by all of the various engines 107 as described herein. The transformation engine 146, in general, converts data flowing out of the enterprise data management and monitoring system 100 from the normalized format into an appropriate special format for the ultimate destination (e.g., the client device 126, one of the network services 128, etc.).

In particular, the normalization engine 142 is configured to normalize outbound raw data of the outbound network traffic 200 into a normalized outbound dataset 218 and normalize inbound raw data of the inbound network traffic 214 into a normalized inbound dataset 220. The outbound raw data and the inbound raw data can include the contents thereof such as specific data entries provided by the client device 126 and/or data response generated by the approved network service 204. Furthermore, the inbound and outbound raw data can include data handling aspects such as formatting, data input locations, data output locations, etc. used by the client device 126 and the approved network service 204. In some embodiments, the contents of the outbound network traffic 200 that the policy engine 110 uses to select the approved network service 204 is the normalized outbound dataset 218.

For example, in some embodiments, the normalization engine 142 is configured to normalize the outbound raw data of the outbound network traffic 200 into the normalized outbound dataset 218 by formatting and categorizing elements of the outbound raw data to conform to normalized data aspects using a second data processing schema 222. The second data processing schema 222 is associated with the intended network service 202 and maps between platform specific data aspects of the intended network service 202 (e.g., the proprietary formatting, data input locations, data output locations, etc.) and the normalized data aspects (e.g., formatting, categorizations, etc. used by the enterprise data management and monitoring system 100). The normalization engine 142 may also be configured to store the normalized outbound dataset 218 in the data storage system 124 for use by other ones of the various engines 107. In some embodiments, the outbound network traffic 200 is converted into the normalized outbound dataset 218 using a different data schema specific to the client device 126. This different data schema can map formatting, data input locations, data output locations, etc. of the client device 126 to the normalized data aspects. Furthermore, in some embodiments, the client device 126 can be configured to output the outbound network traffic 200 according to the normalized data aspects such that the normalized outbound dataset 218 matches the outbound network traffic 200 without dedicated normalization actions being performed by the normalization engine 142.

The same process can be applied to the inbound network traffic 214. Specifically, the normalization engine 142 is configured to normalize the inbound raw data of the inbound network traffic 214 into the normalized inbound dataset by formatting and categorizing elements of the inbound raw data to conform to the normalized data aspects. However, because the inbound network traffic 214 is a response received from the approved network service 204 and is directed to the client device 126, the normalization engine 142 is configured to use the first data processing schema 210 to normalize the raw inbound data into the normalized inbound dataset 220. In these embodiments, the first data processing schema 210 maps between platform specific data aspects of the approved network service 204 and the normalized data aspects. The normalization engine 142 may also be configured to store the normalized inbound dataset 220 in the data storage system 124 for use by other ones of the various engines 107.

The transformation engine 146 is configured to generate the destination specific dataset 208 based on the contents of the outbound network traffic 200 and the first data processing schema 210. In particular, the transformation engine 146 is configured to use the first data processing schema 210 to transform the normalized outbound dataset 218 into the destination specific dataset 208. For example, the transformation engine 146 may transform the normalized outbound dataset 218 into the destination specific dataset 208 by formatting and categorizing elements of the normalized outbound dataset 218 to conform to the platform specific data aspects of the approved network service 204 using the first data processing schema 210.

The same process can be applied with respect to the inbound network traffic 214 and the normalized inbound dataset 220. Specifically, the transformation engine 146 is configured to generate the recipient specific dataset based on the contents of the inbound network traffic and the first data processing schema by using the first data processing schema to transform the normalized inbound dataset into the recipient specific dataset 216. The transformation engine 146 may transform the normalized inbound dataset 220 into the recipient specific dataset 216 by formatting and categorizing the elements of the normalized inbound dataset 220 to conform to the platform specific data aspects of the intended network service intended network service 202 that the client device 126 expects to receive based on the initial request to interact with the intended network service 202 as part of the outbound network traffic 200. The transformation engine 146 may use the second data processing schema 222 to perform this formatting and categorization. However, in some embodiments transformation engine 146 may use the different data schema specific to the client device 126 to perform the formatting and categorization.

As described herein these normalization and transformation operations may be performed using various schema stored in the data storage system 124 (e.g., the first data processing schema 210, the second data processing schema 222, the different data schema specific to the client device 126, etc.). In general, the schema provide a map or correspondence between different formats, data input locations, data output locations, etc. utilized by the enterprise data management and monitoring system 100, the network services 128, and/or the client device 126. In some embodiments, the schema may include web addresses of locations of the network services 128. In such embodiments, the policy engine 110 is configured to transmit the destination specific dataset 208 to the approved network service 204 via the network communication interface 102 using the first data processing schema 210. Similarly, the policy engine 110 may be configured to transmit, the recipient specific dataset 216 to the client device 126 via the network communication interface 102 using the first data processing schema 210 or the different data schema specific to the client device 126.

Taken together the operation of the normalization engine 142 and the transformation engine 146 provide for complete session aware data handling and routing between the client device 126 and the approved network service 204. As described in more detail below, aspects of this data handling process may be modified or further refined by use of additional ones of the various engines 107. For example, selection of the approved network service 204 may be made by utilizing data generated from other ones of the various engines 107.

This data handling process facilitated by the policy engine 110 may best be understood in connection with an example intended interaction of the client device 126 with an intended unapproved generative AI network service (e.g., a service not listed among the set of approved network services 206). However, it should be appreciated that the functionality of the enterprise data management and monitoring system 100 is not limited to this specific example.

First, a user navigates to a home page of the intended unapproved generative AI network service using the client device 126 to initiate a request (e.g., ask the service a question, ask for generation of programming code, ask for generation of images, etc.). The client device 126 having been configured to work with the enterprise data management and monitoring system 100 works with the network communication interface 102 and the interception engine 108 to intercept the network traffic being directed to the intended unapproved generative AI network service (e.g., outbound network traffic 200). This network traffic may be seamlessly integrated into the interface of the intended unapproved generative AI network service or the client device 126 may redirect to the user interface managed by the portal engine 112 as described herein.

In either case, the policy engine 110 parses the network traffic to identify the intended unapproved generative AI network service and then select another different generative AI service as the approved network service 204. This different generative AI service is selected using the various additional criteria described herein such that different generative AI service is suitable to handle the request submitted by the client device 126. As such, the policy engine 110 may use the content of the request when selecting the different generative AI service.

Once the different generative AI service is selected, the policy engine 110 transforms the request and other aspect of the network traffic directed to the intended unapproved generative AI network service into data properly formatted for receipt by the different generative AI service (e.g., generating the destination specific dataset 208). The different generative AI service then processes the data sent by the enterprise data management and monitoring system 100 to generate the output noted in the request. That output (e.g., the inbound network traffic 214) is then routed back to the enterprise data management and monitoring system 100 and intercepted by the interception engine 108.

Once the generated output is received, the policy engine 110 parses the generated output and accompanying network traffic to identify the client device 126 that should receive the request (e.g., recalling the network session data 212). Once identified, the policy engine 110 modifies or manipulates the generated output to confirm to the output expected from the intended unapproved generative AI service (e.g., generates the recipient specific dataset 216). The policy engine 110 then sends this modified version of the generated output back to the client device 126 for display in the relevant interface (e.g., the interface of the intended unapproved generative AI service or the portal engine 112). This process may then repeat until the user of the client device 126 ends the session and has received a satisfactory output. Furthermore, because the policy engine 110 selects the generative AI model that actually generates the ultimate output displayed on the client device 126, the policy engine 110 can be configured to switch to different generative service during a session in the event that the requests form the user of the client device 126 would be better fulfilled by a different service than that originally selected to replace the intended unapproved generative AI service.

Figure 2C:
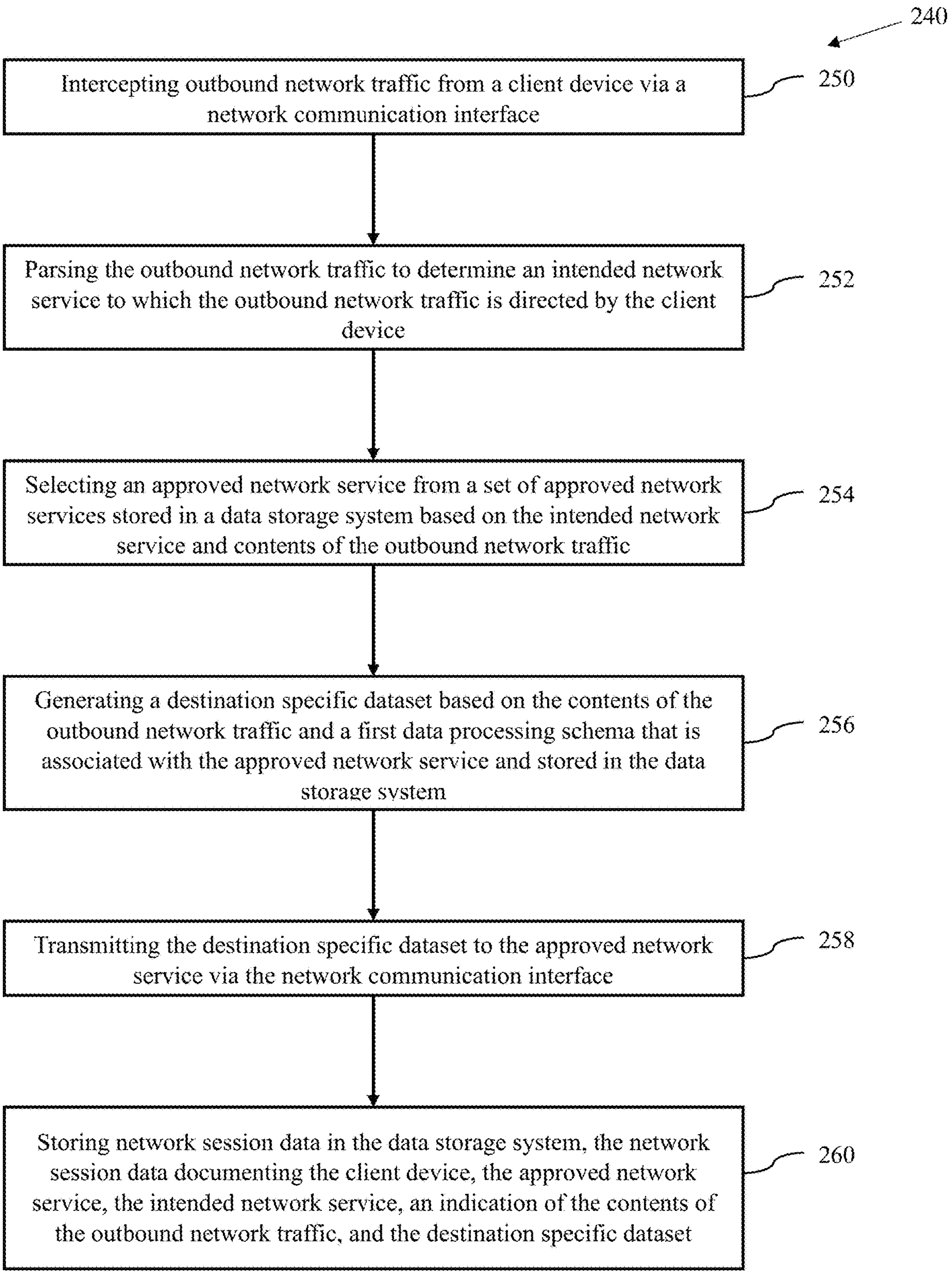
FIG. 2C is a flow diagram of a method according to some embodiments.

FIG. 2C shows a method 240 for operating the enterprise data management and monitoring system 100. The method 240 may be performed by the processing unit 104 executing the instructions for one or more of the various engines 107 as stored in the memory unit 106.

At block 250, the method 240 includes intercepting the outbound network traffic 200 from the client device 126 via the network communication interface 102.

At block 252, the method 240 includes parsing the outbound network traffic 200 to determine the intended network service 202 to which the outbound network traffic 200 is directed by the client device 126.

At block 254, the method 240 includes selecting the approved network service 204 from the set of approved network services 206 stored in the data storage system 124 based on the intended network service 202 and contents of the outbound network traffic 200.

At block 256, the method 240 includes generating the destination specific dataset 208 based on the contents of the outbound network traffic 200 and the first data processing schema 210 that is associated with the approved network service 204 and stored in the data storage system 124.

At block 258, the method 240 includes transmitting the destination specific dataset 208 to the approved network service 204 via the network communication interface 102.

At block 260, the method 240 includes storing the network session data 212 in the data storage system 124, the network session data 212 documenting the client device 126, the approved network service 204, the intended network service 202, an indication of the contents of the outbound network traffic 200, and the destination specific dataset 208.

The method 240 can also include intercepting the inbound network traffic 214 from the approved network service 204 via the network communication interface 102; recalling the network session data 212 from the data storage system 124 based on contents of the inbound network traffic 214; generating the recipient specific dataset 216 based on the contents of the inbound network traffic 214, the network session data 212, and the first data processing schema 210 that is associated with the approved network service; transmitting the recipient specific dataset 216 to the client device 126 via the network communication interface 102; and updating the network session data 212 to include an indication of the contents of the inbound network traffic 214.

The method 240 can also include normalizing outbound raw data of the outbound network traffic 200 into the normalized outbound dataset 218; normalizing the inbound raw data of the inbound network traffic 214 into the normalized inbound dataset 220; generating the destination specific dataset 208 based on the contents of the outbound network traffic 200 and the first data processing schema 210 by using the first data processing schema 210 to transform the normalized outbound dataset 218 into the destination specific dataset 208; and generating the recipient specific dataset 216 based on the contents of the inbound network traffic 214 and the first data processing schema 210 by using the first data processing schema 210 to transform the normalized inbound dataset 220 into the recipient specific dataset 216.

The method 240 can also include normalizing the outbound raw data of the outbound network traffic 200 into the normalized outbound dataset 218 by formatting and categorizing elements of the outbound raw data to conform to normalized data aspects using the second data processing schema 222 associated with the intended network service 202 and normalizing the inbound raw data of the inbound network traffic 214 into the normalized inbound dataset 220 by formatting and categorizing elements of the inbound raw data to conform to the normalized data aspects using the first data processing schema 210. The second data processing schema 222 maps between platform specific data aspects of the intended network service 202 and the normalized data aspects and the first data processing schema 210 maps between platform specific data aspects of the approved network service 204 and the normalized data aspects.

The method 240 can also include transforming the normalized outbound dataset 218 into the destination specific dataset 208 by formatting and categorizing elements of the normalized outbound dataset 218 to conform to the platform specific data aspects of the approved network service 204 using the first data processing schema 210; and transforming the normalized inbound dataset 220 into the recipient specific dataset 216 by formatting and categorizing elements of the normalized inbound dataset 220 to conform to the platform specific data aspects of the intended network service 202 using the second data processing schema 222.

Intent Detection and Policy Control Engines

Figure 3A:
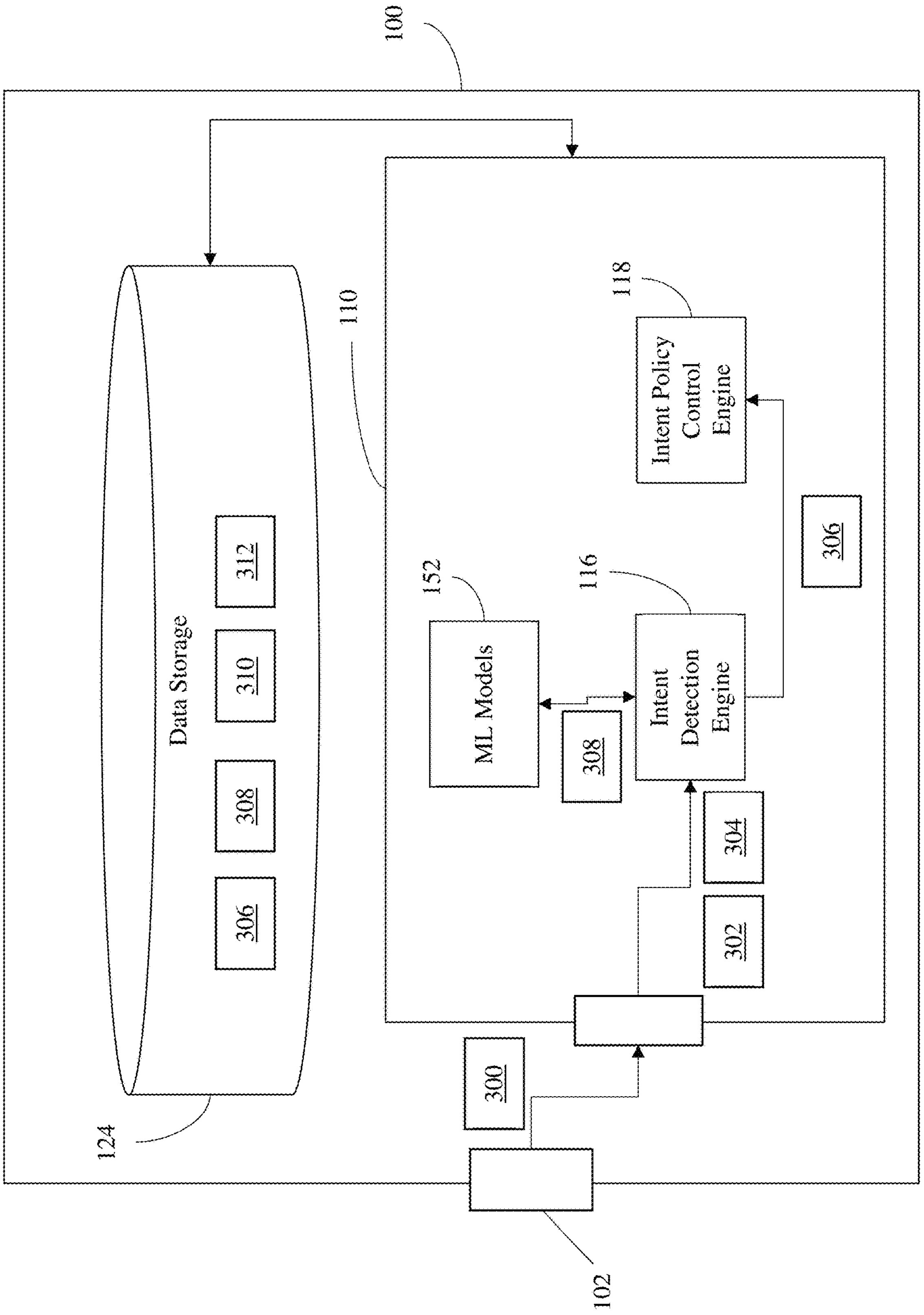
FIG. 3A is a block diagram showing details of intent detection and policy control engines of the Enterprise Data Management and Monitoring system of FIG. 1A according to some embodiments.

Operation of the intent detection engine 116 and the intent policy control engine 118 are described in more detail with reference now to FIG. 3A. In general, the intent detection engine 116 operates to detect an intention behind intercepted network traffic 300 and interactions between the client device 126 and the network services 128. In general, the intent policy control engine 118 administers aspects of the network traffic 300 such as performing modifications or manipulations thereof based on the intent determination made by the intent detection engine 116. As shown in FIG. 3A, the intent detection engine 116 and intent policy control engine 118 may be part of the policy engine 110. In these embodiments, the intent determination made by the intent detection engine 116 may be used in the operations of the policy engine 110 as described above and the aspects of the network traffic 300 managed by the intent policy control engine 118 may include or assist with some or all of the modifications and manipulations performed by the policy engine 110 or other sub-engines thereof. Furthermore, the network traffic 300 may be intercepted by the interception engine 108 via the network communication interface 102 and may include the outbound network traffic 200 and the inbound network traffic 214 described elsewhere herein. While not pictured in FIG. 3A, it should be appreciated that the intent detection engine 116 and the intent policy control engine 118 comprise instructions stored on the memory unit 106 that are executed by the processing unit 104 as described elsewhere herein.

As shown in FIG. 3A, the intent detection engine 116 is configured to receive context data 302 and content data 304 relating to the network traffic 300. In general, the context data 302 includes metadata or other similar data elements that provide context to the network traffic 300. In some embodiments, the context data includes one or more of a role assigned to a user account linked to the network traffic 300, an intended network service for the network traffic 300 (e.g., intended network service 202), an indication of a registered client device associated with the network traffic 300 (e.g., client device 126), a location of the registered client device, and a time and date when the network traffic 300 was initiated, intercepted, etc., The content data 304 for the network traffic 300 may comprise user inputs from the client device 126, responses or other data generated by the network services 128, etc. Furthermore, in some embodiments, the context data 302 and the content data 304 may be portions of the normalized outbound dataset 218 and/or the normalized inbound dataset 220 discussed above with respect to FIGS. 2A-2C.

The intent detection engine 116 is configured to generate an intent indexer 306 for the network traffic 300 based on the context data 302 and the content data 304. The intent indexer 306 documents an operation request and a subject of the operation request that are connected to the network traffic 300. The operation request may include a specific action or the like that is being requested or performed with respect to interaction between the client device 126 and the network services 128 as documented in the network traffic 300. The action can include generating, downloading, summarizing, drafting etc. and the subject can include the target of the action. The subject can include a general target of the action (e.g., a downloaded document, a summarized report, a generated image, drafted programming code, etc.) and/or a topic or domain specific target of the action (e.g., human resource documents, web page display images, marketing images, mobile application programing code, desktop application programming code, etc., Table 1 below includes a non-exhaustive list of example intent indexers including the operation request and subject.

TABLE 1

Example Intent Indexers

| Operation | Subject |
|---|---|
| analyze | advantages |
| analyze | business proposal |
| analyze | data visualization |
| analyze | development code |
| analyze | feedback |
| analyze | financial document |
| analyze | information technology security policy |
| analyze | legal contract |
| analyze | marketing campaign |
| analyze | marketing persona |
| analyze | packaging design |
| analyze | performance review |
| analyze | process |
| analyze | product description |
| analyze | product review |
| analyze | product roadmap |
| analyze | project plan |
| analyze | project proposal |
| analyze | research document |
| analyze | sales forecast |
| analyze | sales presentation |
| analyze | social media campaign |
| analyze | technical documentation |
| analyze | training program outline |
| analyze | user manual |
| analyze | website concept |
| generate | business proposal |
| generate | data visualization |
| generate | development code |
| generate | financial document |
| generate | ideas |
| generate | information technology security policy |
| generate | job descriptions |
| generate | learning plan |
| generate | legal contract |
| generate | marketing campaign |
| generate | marketing persona |
| generate | packaging design |

TABLE 1-continued

| Example Intent Indexers | |
|---|---|
| Operation | Subject |
| generate | performance review |
| generate | process |
| generate | product description |
| generate | product review |
| generate | product roadmap |
| generate | project plan |
| generate | project proposal |
| generate | recommendations |
| generate | research document |
| generate | sales forecast |
| generate | sales presentation |
| generate | social media campaign |
| generate | technical documentation |
| generate | template |
| generate | greeting or farewell |
| summarize | advantages |
| summarize | business proposal |
| summarize | data visualization |
| summarize | development code |
| summarize | financial document |
| summarize | information technology security policy |
| summarize | job descriptions |
| summarize | legal contract |
| summarize | marketing campaign |
| summarize | marketing persona |
| summarize | packaging design |
| summarize | performance review |
| summarize | process |
| summarize | product description |
| summarize | product review |
| summarize | product roadmap |
| summarize | project plan |
| summarize | project proposal |
| summarize | research document |
| summarize | sales forecast |
| summarize | sales presentation |
| summarize | social media campaign |
| summarize | technical documentation |
| summarize | training program outline |
| summarize | user manual |
| summarize | website concept |
| analyze | employee engagement survey |
| analyze | sustainability document |
| analyze | training feedback |
| analyze | workplace injury trends |
| generate | business continuity plan |
| generate | corporate giving budget |
| generate | csr impact document |
| generate | customer feedback survey |
| generate | employee handbook |
| generate | environmental audit checklist |
| generate | equipment maintenance schedule |
| generate | ergonomic assessment |
| generate | health & safety inspection checklist |
| generate | hr diversity document |
| generate | it disaster recovery plan |
| generate | product recall plan |
| generate | quality management plan |
| generate | rfp for vendors |
| generate | risk management plan |
| generate | stakeholder communication plan |
| generate | succession plan |
| generate | supplier code of conduct |
| generate | sustainability targets |
| generate | workplace emergency procedures |
| summarize | customer service metrics |
| summarize | employee turnover analysis |
| summarize | facilities maintenance records |
| summarize | financial audit findings |
| summarize | product quality documents |
| summarize | purchasing spend analysis |
| summarize | sales lead conversion rates |
| summarize | software bug documents |
| summarize | supply chain bottlenecks |
| analyze | corporate reputation |
| analyze | crisis communication response |

TABLE 1-continued

| Example Intent Indexers | |
|---|---|
| Operation | Subject |
| analyze | media coverage sentiment |
| generate | brand guidelines |
| generate | crisis communication plan |
| generate | executive briefing |
| generate | media list |
| generate | press release |
| generate | product launch plan |
| generate | thought leadership content |
| summarize | campaign reach and engagement |
| summarize | competitor analysis |
| summarize | customer feedback |
| summarize | market research findings |
| summarize | website analytics |
| generate | sponsorship proposal |
| generate | event plan |
| generate | customer service workflow |
| analyze | employee training needs |
| generate | engineering project timeline |
| summarize | facility maintenance requests |
| analyze | capital expenditure budget |
| generate | safety inspection schedule |
| summarize | employee retention initiatives |
| generate | network security roadmap |
| analyze | legal compliance gaps |
| generate | social media editorial calendar |
| analyze | production bottlenecks |
| generate | product launch checklist |
| generate | media contact list |
| analyze | vendor contracts |
| generate | quality control plan |
| analyze | sales quota attainment |
| generate | software development timeline |
| analyze | strategic plan progress |
| generate | warehouse layout optimization |
| generate | board presentation |
| analyze | customer satisfaction |
| generate | employee orientation agenda |
| summarize | project engineering documents |
| generate | office space utilization plan |
| analyze | accounts receivable trends |
| generate | contractor safety manual |
| summarize | recruitment metrics |
| generate | data backup schedule |
| review | privacy policy updates |
| generate | influencer outreach template |
| analyze | manufacturing capacity |
| generate | product teardown analysis |
| generate | shareholder newsletter |
| analyze | purchase order cycle time |
| generate | manufacturing quality plan |
| analyze | sales lead response rate |
| review | software architecture |
| facilitate | strategy workshop |
| prepare | board meeting minutes |
| summarize | customer satisfaction survey |
| generate | mentorship program outline |
| analyze | equipment uptime percentage |
| generate | office seating chart |
| forecast | cash flow position |
| generate | safety training modules |
| review | access control permissions |
| summarize | litigation risks |
| generate | customer testimonial questions |
| analyze | applicant qualifications |
| generate | interview questions |
| review | resume |
| compare | candidate skills to job requirements |
| generate | offer letter |
| assess | leadership potential |
| evaluate | technical skills |
| generate | personalized development plan |
| set | performance goals |
| evaluate | counteroffer response |
| vehicle | and equipment maintenance |

TABLE 1-continued

| Example Intent Indexers | |
|---|---|
| Operation | Subject |
| obtain | general information |
| obtain | company information |
| understand | corporate reporting structure or roles |

In some embodiments, the intent indexer also documents an assigned enterprise category. In these embodiments, the intent detection engine 116 is configured to assign the enterprise category to the network traffic 300 based on context data 302 and content data 304. The enterprise category may be selected from a plurality of preset categories for a specific enterprise that employs the enterprise data management and monitoring system 100. In some embodiments, the enterprise category may document a specific division or business unit within the enterprise to which the requested operation and subject best match (e.g., human resources, information technology, product management, software and hardware development, etc.). However, it should be appreciated that other categorizations are possible. Table 2 below includes a non-exhaustive list of example enterprise categories.

TABLE 2

| Example Enterprise Categories |
|---|
| corporate social responsibility |
| customer service or support |
| engineering |
| facilities management |
| finance and accounting |
| health, safety, and environment |
| human resources |
| information technology |
| legal and compliance |
| marketing |
| operations |
| product management |
| public relations |
| purchasing and procurement |
| quality assurance |
| sales |
| software and hardware development |
| strategic planning and business development |
| supply chain and logistics |

As shown in FIG. 3A, in some embodiments, the intent detection engine 116 may be configured to use the ML models 152 to assist in generating the intent indexer 306. For example, the intent detection engine 116 may be configured to input the context data 302 and the content data 304 into a first machine learning model of the ML models 152 and receive a summary 308 of the context data 302 and the content data 304 as an output. The intent detection engine 116 may then be configured to use the output summary 308 of the first machine learning model to generate the intent indexer 306. However, in some embodiments, the intent detection engine 116 may receive the intent indexer 306 directly as the output of the first machine learning model. As shown in FIG. 3A, the intent indexer 306 and the summary 308 may be stored in the data storage system 124 for later use by the various engines 107 of the enterprise data management and monitoring system 100.

In embodiments where the intent detection engine 116 generates the intent indexer 306 from the summary 308, the intent detection engine 116 is configured to identify a nearest neighbor between the summary 308 and entries in a predefined taxonomy 310 of possible operations and/or subjects stored in the data storage system 124. In particular, the operation request and the subject of the operation request may be selected from the predefined taxonomy and then combined together into the intent indexer 306. In some embodiments, the intent detection engine 116 is configured to generate the intent indexer 306 from the summary 308 using a second machine learning model of the ML models 152. In these embodiments, the intent detection engine 116 is configured to input the summary 308 into the second machine learning model and receive the operation request and the subject of the operation request as output, which can then be combined into the intent indexer 306. In some embodiments, the predefined taxonomy 310 may be an additional input into the second machine learning model along with a prompt input directing the second machine learning model to select the operation request and the subject of the operation request as the closet matching entries in the predefined taxonomy 310. It should also be appreciated that the predefined taxonomy 310 may also be similarly used as an input in embodiments where the intent indexer 306 is directly generated from a single machine learning model of the ML models 152.

Furthermore, the intent detection engine 116 may be configured to monitor the network traffic 300 over time to identify changes in the context data 302 and content data 304 and generate a revised intent indexer 306 for the network traffic 300 based on those changes. The revised intent indexer 306 will document a new operation request and/or a new subject of the new operation request that are connected to the network traffic 300. In this way the enterprise data management and monitoring system 100 is able to provide a full session aware management of the network traffic 300 by adapting to changes in the user requested operation and/or subject that may trigger different management and/or control operations as described herein.

As shown in FIG. 3A, intent policy control engine 118 is configured to receive the intent indexer 306 that is generated by the intent detection engine 116. Once received, the intent policy control engine 118 is configured to administer aspects of the network traffic 300 based on the intent indexer 306 and the context data 302. For example, the intent policy control engine 118 may be configured to compare the intent indexer 306 to a set of enforcement rules 312 that are stored in the data storage system 124. The set of enforcement rules 312 may be related to the context data 302 and may define a set of allowable operation requests and subjects, a set of allowable with modification operation requests and subjects, and a set of rejectable operation requests and subjects. In some embodiments, the intent policy control engine 118 is configured to select the set of enforcement rules 312 from among a plurality of different sets of enforcement rules based on the context data 302. For example, the selected set of enforcement rules may be specific to a user account associated with the client device 126, a time of day, the enterprise category of the intent indexer 306, etc.

The intent policy control engine 118 may then be configured to perform different administration actions for the network traffic 300 based on results of the comparison. For example, when the operation request and/or the subject of the operation request included in the intent indexer 306 match entries in the set of rejectable operation requests and subjects, the intent policy control engine 118 may be configured to block further transmission of the network traffic 300. In some embodiments, the portal engine 112 or other one of the various engines 107 may initiate display of a notification on the client device 126 that the network traffic 300 has been blocked. Furthermore, when both the operation request and the subject of the operation request included in the intent indexer 306 match entries in the set of allowable operation requests and subjects, the intent policy control engine 118 may be configured to allow further transmission of the network traffic 300 without any additional modification. Further still, when both the operation request and the subject of the operation request included in the intent indexer 306 fail to match entries in the set of rejectable operation requests and subjects and at least one of the operation request and the subject of the operation request included in the intent indexer 306 match entries in the set of allowable with modification operation requests and subjects, the intent policy control engine 118 may be configured to modify the network traffic 300. It should also be appreciated that in embodiments where the intent indexer 306 includes the enterprise category, the sets of rejectable, allowable, and allowable with modification operation requests and subjects may also be grouped into and selected for comparison based on enterprise categories.

Modifying the network traffic 300 may include selecting an approved destination (e.g., approved network service 204) for the network traffic 300 that is different from an intended destination (e.g., intended network service 202) of the network traffic 300. In particular, the intent policy control engine 118 may select the approved network service 204 as one of the set of approved network services 206 (see FIGS. 2A and 2B) that has demonstrated good past performance (1) when performing similar operations (e.g., generation tasks, summarization tasks, etc.) to the operation request included in the intent indexer 306 and/or (2) on similar subjects (e.g., the general and/or topic and domain specific targets described herein) to the subject of the operation request included in the intent indexer 306. For example, the intent policy control engine 118 may select the approved network service 204 as one which has demonstrated good past performance at generating mobile application programing code where the operation request and subject included in the intent indexer 306 relate to generating code for use in constructing a mobile device application. To facilitate this selection, the set of approved network services 206 may be associated in the data storage system 124 with a list of past intent indexers and associated scores or similar metrics documenting an assessment of past results produced by the respective service when performing the task outlined by the associated past intent indexers. The assessment score or metric may be formed from objective review of the past results by the enterprise data management and monitoring system 100 (e.g., a comparison of how closely the past result match one or more known acceptable results saved in the data storage system 124) and/or subjective feedback on the past results provided by users. Additionally, the approved network service 204 may be associated with specific enterprise categories to further assist in selection by the intent policy control engine 118.

Furthermore, to select the approved network service 204 from the set of approved network services 206, the intent policy control engine 118 may determine a similarity metric between the intent indexer 306 and the past intent indexers stored in the data storage system 124. The similarity metric may be calculated using ML models 152 and/or using standard matching algorithms known in the art. Then the similarity metric is used to identify the most similar or a set of the most similar past intent indexers. In some embodiments, the ML models 152 may be used to simply identify the most similar or a set of the most similar past intent indexers without calculating the similarity metric. Once the most similar or a set of the most similar past intent indexers are identified, the intent policy control engine 118 can select the approved network service 204 as the service that is linked to the most similar or a set of the most similar past intent indexers and that has the highest assessment score. In some embodiments, the intent policy control engine 118 may present a set of different options to the client device 126 where the assessment scores are the same or differ only insignificantly.

Beyond selecting the approved network service 204, modifying the network traffic 300 may include modifying the contents of the network traffic 300 into an approved variation thereof. For example, an approved variation of the content of the network traffic 300 may include anonymizing overly sensitive details like proper nouns or removing other extraneous details not needed by the destination network service to properly respond to the request from the client device 126. This content modification may include or be performed in conjunction with normalization and transformation operations performed by the normalization engine 142 and transformation engine 146 as described herein.

Figure 3B:
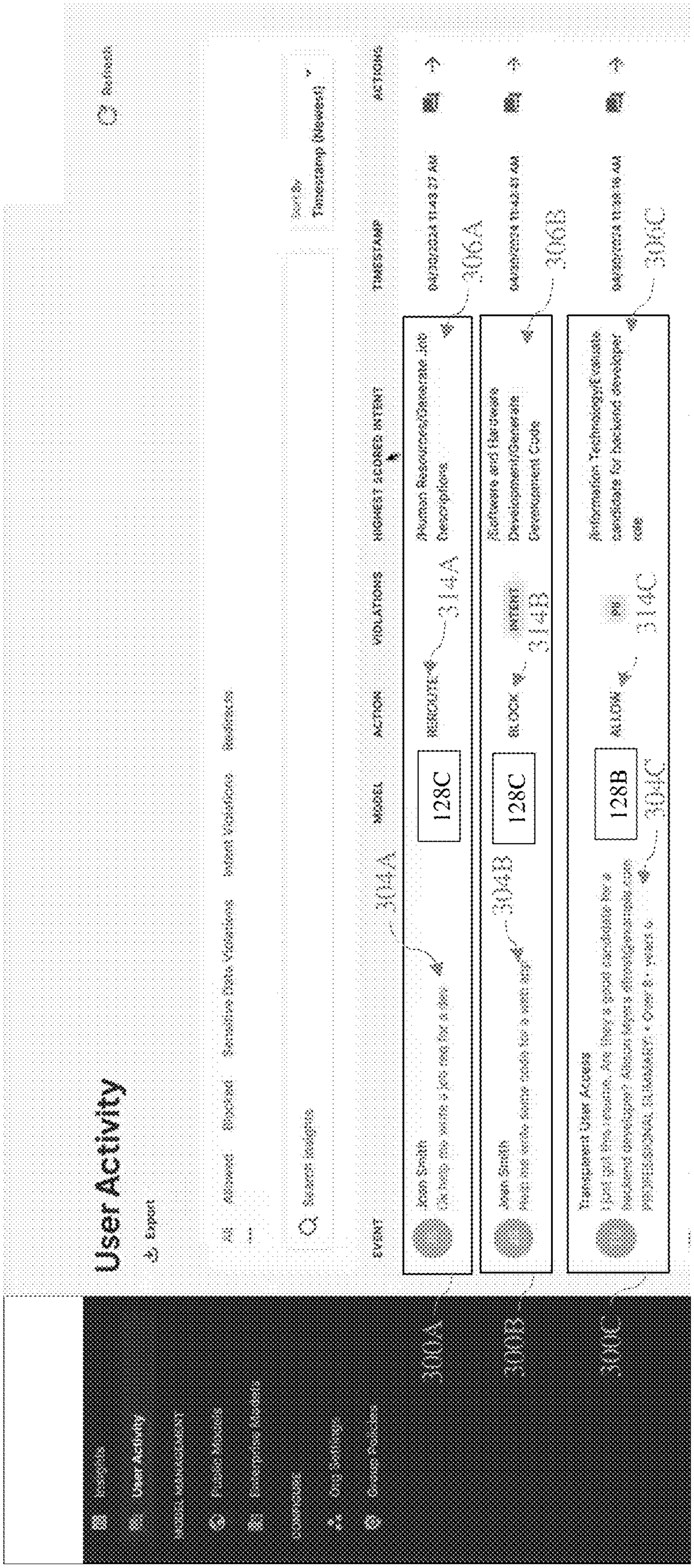
FIG. 3B is a graphical user interface display of intent determinations and control actions made by the Enterprise Data Management and Monitoring system of FIG. 1A according to some embodiments.

Operation of the intent detection engine 116 and intent policy control engine 118 may best be understood in connection with example network traffic events 300A, 300B, and 300C shown in the example graphical interface display of FIG. 3B. The example network traffic events 300A, 300B, and 300C relate to different interactions of the client device 126 with various generative AI network services. However, it should be appreciated that the functionality of the enterprise data management and monitoring system 100 is not limited to this specific example.

As shown in FIG. 3B, the network traffic event 300A includes content data 304A comprising a request for one of the private services 128C to "help me write a job req for a dev." The intent detection engine 116 processes the content data 304A to generate an intent indexer 306A for the network traffic event 300A. The intent indexer 306A includes the enterprise category of "human resources," the operation request of "generate," and the subject of "job descriptions," which correlate with the content data 304A and are identified by one of the methods described herein. The intent policy control engine 118 then performs a corresponding administrative action 314A for the network traffic event 300A based on the intent indexer 306A, which in this case includes rerouting the request to a specific one of the private services 128C best suited to generate job descriptions because the generate operation request and/or the job descriptions subject were allowable with modification entries as described herein.

The network traffic event 300B includes content data 304B comprising another request for one of the private services 128C to "help me write some code for a web app." The intent detection engine 116 processes the content data 304B to generate an intent indexer 306B for the network traffic event 300B. The intent indexer 306B includes the enterprise category of "software and hardware development," the operation request of "generate," and the subject of "development code," which correlate with the content data 304B and are identified by one of the methods described herein. The intent policy control engine 118 then performs a corresponding administrative action 314B for the network traffic event 300B based on the intent indexer 306B, which in this case includes blocking the request because code generation is not an allowed operation for the network traffic event 300B (e.g., code generation is a rejectable entry for the user Joan Smith).

The network traffic event 300C includes content data 304C comprising a request for one of the publicly available services 128B assist in reviewing a resume. The intent detection engine 116 processes the content data 304C to generate an intent indexer 306C for the network traffic event 300C. The intent indexer 306C includes the enterprise category of "information technology," the operation request of "evaluate," and the subject of "candidate for backend developer role," which correlate with the content data 304C and are identified by one of the methods described herein. The intent policy control engine 118 then performs a corresponding administrative action 314C for the network traffic event 300C based on the intent indexer 306C, which in this case includes allowing the request to proceed without any modification because the proposed evaluation is an allowed operation for the network traffic event 300C (e.g., the evaluate operation and subject were not on the sets of rejectable or allowable with modification entries).

Figure 3C:
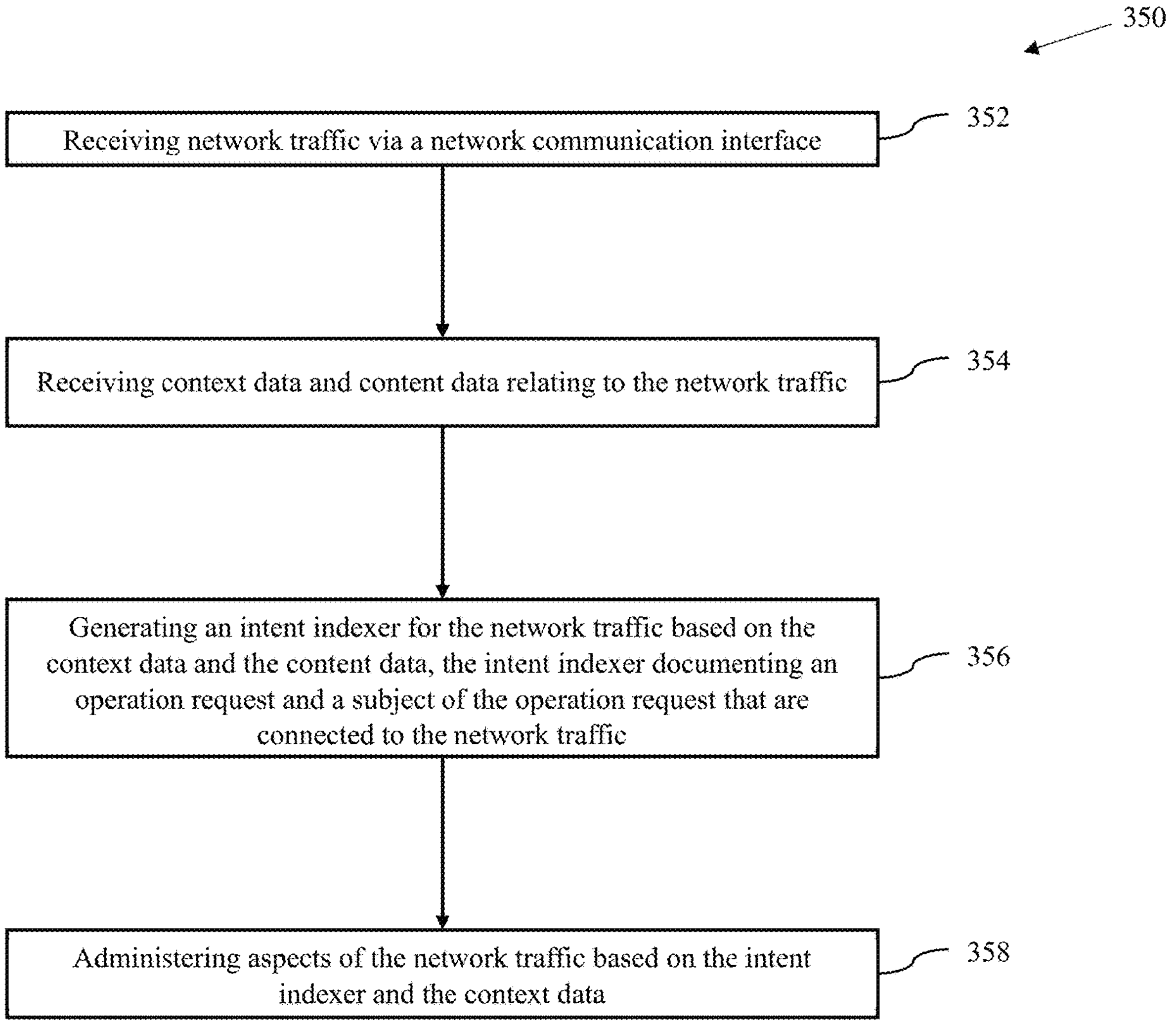
FIG. 3C is a method according to some embodiments.

FIG. 3C shows a method 350 for operating the enterprise data management and monitoring system 100. The method 350 may be performed by the processing unit 104 executing the instructions for one or more of the various engines 107 as stored in the memory unit 106.

At block 352, the method 350 includes receiving network traffic 300 via a network communication interface 102.

At block 354, the method 350 includes receiving context data 302 and content data 304 relating to the network traffic 300.

At block 356, the method 350 includes generating an intent indexer 306 for the network traffic 300 based on the context data 302 and the content data 304, the intent indexer 306 documenting an operation request and a subject of the operation request that are connected to the network traffic 300.

At block 357, the method 350 includes administering aspects of the network traffic 300 based on the intent indexer 306 and the context data 302.

The method 350 may also include inputting the context data 302 and the content data 304 into a first machine learning model; receiving a summary 308 of the context data 302 and the content data 304 as an output of the first machine learning model; identifying a nearest neighbor between the summary 308 and entries in a predefined taxonomy 310 of possible operations and/or subjects, the nearest neighbor identifying the operation request and the subject of the operation from the predefined taxonomy 310 of possible operations and/or subjects; and generating the intent indexer 306 from the nearest neighbor.

The method 350 may also include administering the aspects of the network traffic 300 based on the intent indexer 306 and the context data 302 by comparing the intent indexer 306 to a set of enforcement rules 312, the set of enforcement rules 312 being related to the context data 302 and defining a set of allowable operation requests and subjects, a set of allowable with modification operation requests and subjects, and a set of rejectable operation requests and subjects; blocking further transmission of the network traffic 300 when the operation request and/or the subject of the operation request included in the intent indexer 306 match entries in the set of rejectable operation requests and subjects; allowing further transmission of the network traffic 300 when both the operation request and the subject of the operation request included in the intent indexer 306 match entries in the set of allowable operation requests and subjects; and modifying the network traffic 300 when both the operation request and the subject of the operation request included in the intent indexer 306 fail to match entries in the set of rejectable operation requests and subjects and at least one of the operation request and the subject of the operation request included in the intent indexer 306 match entries in the set of allowable with modification operation requests and subjects.

Differentiation of Risks of Network Services

As described in the foregoing sections, the various network services 128 (e.g., the customer provided network services 128A, publicly available AI or ML services 128B, and private AI or ML services 128C) have various potential benefits but also various potential risk factors associated to a user and enterprise utilizing the network services 128. At a very high level, these risk factors for any particular one of the network services 128 could include for example (1) the service persistently storing user input and/or service output, (2) the service including AI or ML aspects that train and/or update its model(s) based on the user input, (3) the service lacking moderation functionalities to prevent the use and/or output of harmful, inappropriate, risky, or controversial content, (4) intentional policies of the service that permit the service to provide user input and/or service output to third parties, (5) the training data used to create its model(s), and/or (6) other technological vulnerabilities of the service that may allow third parties to access user input and/or service output (e.g., via theft, bug/vulnerability exploits, social engineering, and/or other means). These risk factors may be especially prevalent, for example, when the network services 128 are not owned, operated, and/or managed by the enterprise (e.g., as may particularly be the case with publicly available AI or ML services 128B). When a particular one of the network services 128 is characterized by one or more of these risk factors, use of the service can risk disclosure and/or corruption of data belonging to the user and/or to the enterprise. However, the type and extent of the risk posed by use of any one of the network services 128 may vary even further based on the precise context of use of the service.

Referring back to FIG. 1A, to account for document and account for the respective risk factors of the various network services 128, the service differentiation engine 122 may be configured to perform various functionalities, including for example storing lists of available network services 128, discovering and/or documenting risk factors associated with respective ones of the network services 128, and controlling interactions with any one or more of the network services 128 (e.g., by selecting which of the network services 128 and/or determining what data is to be provided to any one or more of the network services 128 in any particular context).

Figure 4A:
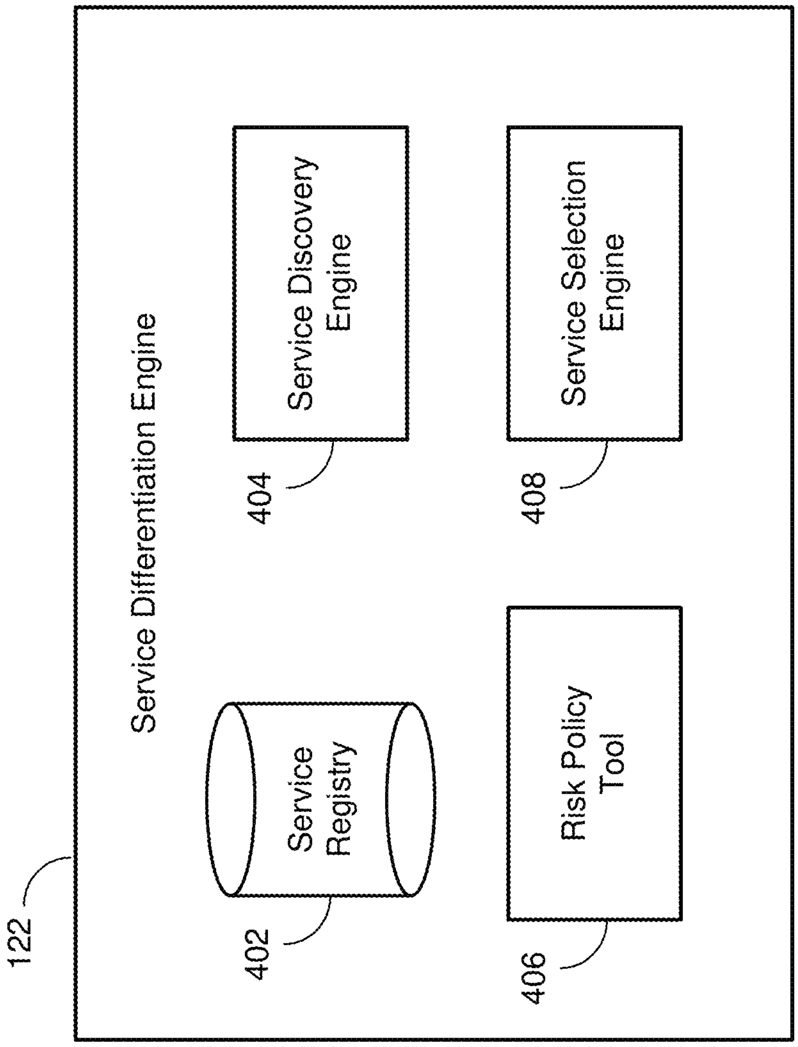
FIG. 4A is a block diagram of a service differentiation engine according to some embodiments.

FIG. 4A is a block diagram of example aspects of the service differentiation engine 122 from FIG. 1A. It should be appreciated that these aspects are provided as example only, and the service differentiation engine 122 as implemented in the enterprise data management and monitoring system 100 may include additional, fewer, and/or alternate aspects. The various aspects of the service differentiation engine 122 will be detailed also with reference to FIGS. 4B-4F, which depict example graphical user interfaces (GUIs) associated with operation of the service differentiation engine 122. The GUIs of FIGS. 4B-4F may be displayed, for example, by the client device 126, and may be controlled for example via touchscreen interactions, mouse/keyboard input, voice interaction, and/or other suitable forms of user input.

As depicted in FIG. 4A, the service differentiation module includes a service registry 402 storing indications the network services known to the enterprise data management and monitoring system 100. The service registry 402 may be stored via one or more memories associated with the enterprise data management and monitoring system 100, e.g., the memory unit 106. Network services in the service registry 402 may include publicly available AI or ML services 128B from FIG. 1A, which may include pretrained AI-based services managed and controlled by third parties external to an enterprise and which may present heightened risks to the enterprise for reasons provided herein. It should be appreciated, though, that the network services indicated in the service registry 402 may additionally or alternatively include the customer provided network services 128A and/or the private AI or ML services 128C of FIG. 1A. In any case, these network services may for example include network services 204 of FIG. 2A that are approved to service requests, and/or intended network services 202 which may or may not be approved to service requests.

The service registry 402 may include configuration and/or location information (e.g., DNS resolution information) that enables the enterprise data management and monitoring system 100 to locate and access any of the services contained therein as desired, e.g., in response to a request and/or upon identification as an approved network service.

Figure 4B:
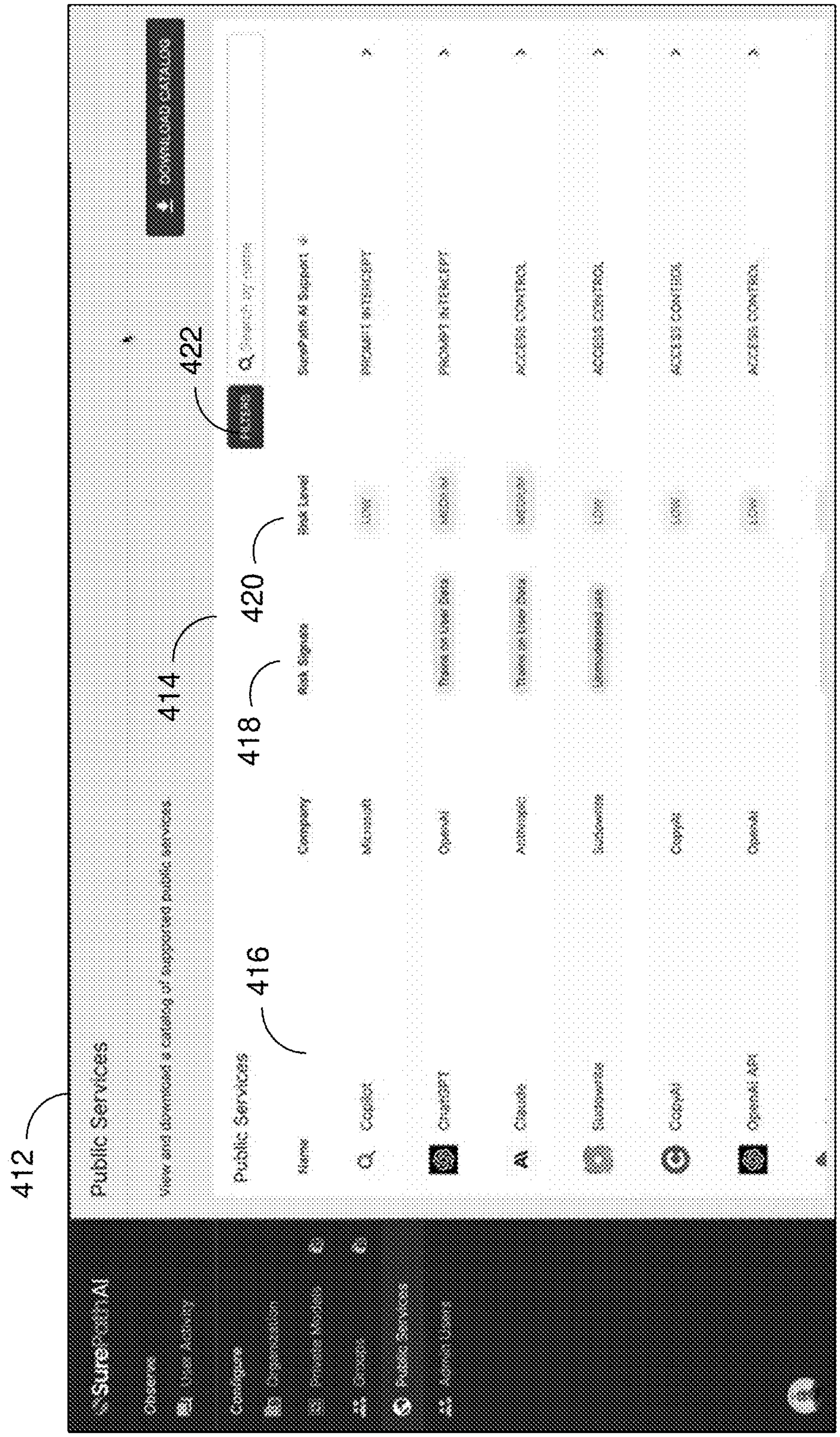
FIG. 4B depicts an example graphical user interface (GUI) indicating services known to a service registry according to some embodiments.

Additionally, the service registry 402 defines various risk information associated with each respective service contained in the service registry 402, as depicted for example in FIGS. 4B-4F. Beginning with FIG. 4B, a GUI 412 displays at least some contents of the service registry 402, including a list of public services 414 known to the enterprise data management and monitoring system 100 (e.g., publicly available AI or ML services 128B). A column 416 displays identifiers of the respective public services, which as shown in FIG. 4B may include services originating from a number of different developers, publishers, and/or managers. Further columns display risk identifiers associated with the respective services. Specifically, another column 418 displays risk signals (factors) and associated with the respective services, and still another column 420 displays aggregated risk levels associated with the respective services. Risk signals may include, for example, an indicator that a service trains/updates its model(s) based on user data, and/or applies insufficient moderation policies. As will be described further in this section, the risk signals and risk levels may be defined by human users and/or identified automatically via other operations of the service differentiation engine 122. Still additionally, the GUI 412 includes a searching/filtering element(s) 422, via which the user of the GUI 412 may filter listed services based upon name, publisher, developer, manager, risk signals, risk level, and/or other criteria described herein.

In some instances, the list of public services 414 can include multiple versions of a same network service. That is, a publisher or developer may develop updated versions of a similarly branded network service, and these updated versions may each receive separate entries in the service registry 402. When represented in the GUI 412, the multiple versions may for example be displayed under a heading identifying a brand, publisher, developer, etc. of the service (e.g., "Copilot" or "Microsoft Copilot"), with the respective versions receiving separate row entries below the heading. The row entry for each respective service version may include its own respective risk signals, risk level, and/or other risk information described herein, as any updated version of a service may produce risk considerations different from those of a preceding version(s). Moreover, the service registry 402 may similarly distinguish between a first instance of a network service managed privately by the enterprise (e.g., a version accessed via an enterprise account or via a user account supervised by the enterprise), and a second instance of the otherwise same network service that is not managed privately by the enterprise (e.g., a version accessed via a user account not associated or managed by the enterprise).

A user of the GUI 412 may select any of the services from the public services list 414 to view additional information associated with risk identifiers (e.g., the risk signal(s) and/or aggregated risk level) and/or other stored or otherwise accessible information associated with the selected service. Moving to FIG. 4C, a GUI 430 displays at least a portion of the information from the GUI 412 of FIG. 4B, overlaid by a service panel 432 providing service specific information about the selected service. The service specific information can include, for example, the service name, developer, publisher, manager, a description of the service's intended functionalities, website, configuration within the enterprise, etc.

Figure 4C:
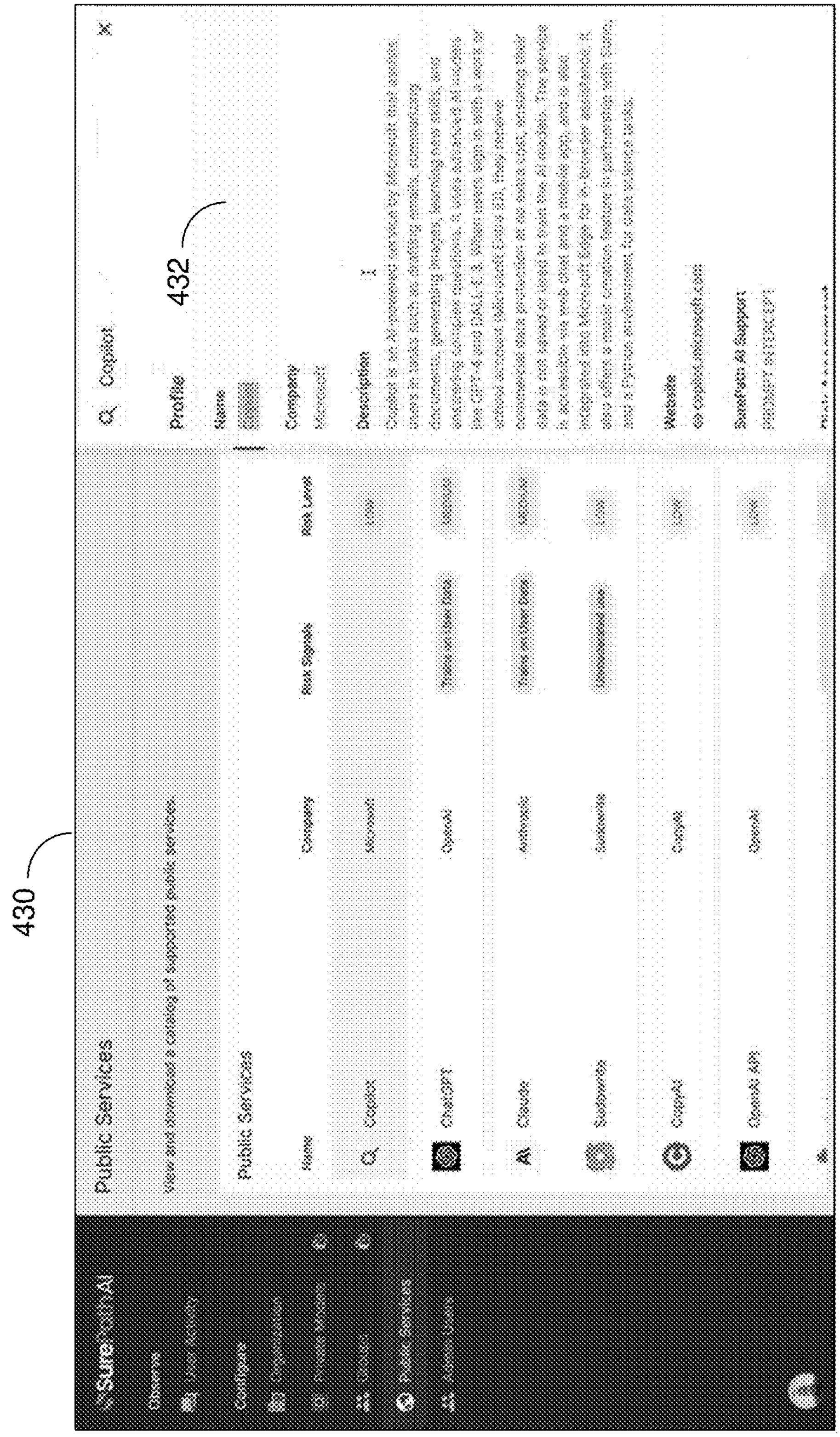
FIG. 4C depicts another example GUI indicating service specific information corresponding to a first service in the service registry according to some embodiments.
Figure 4D:
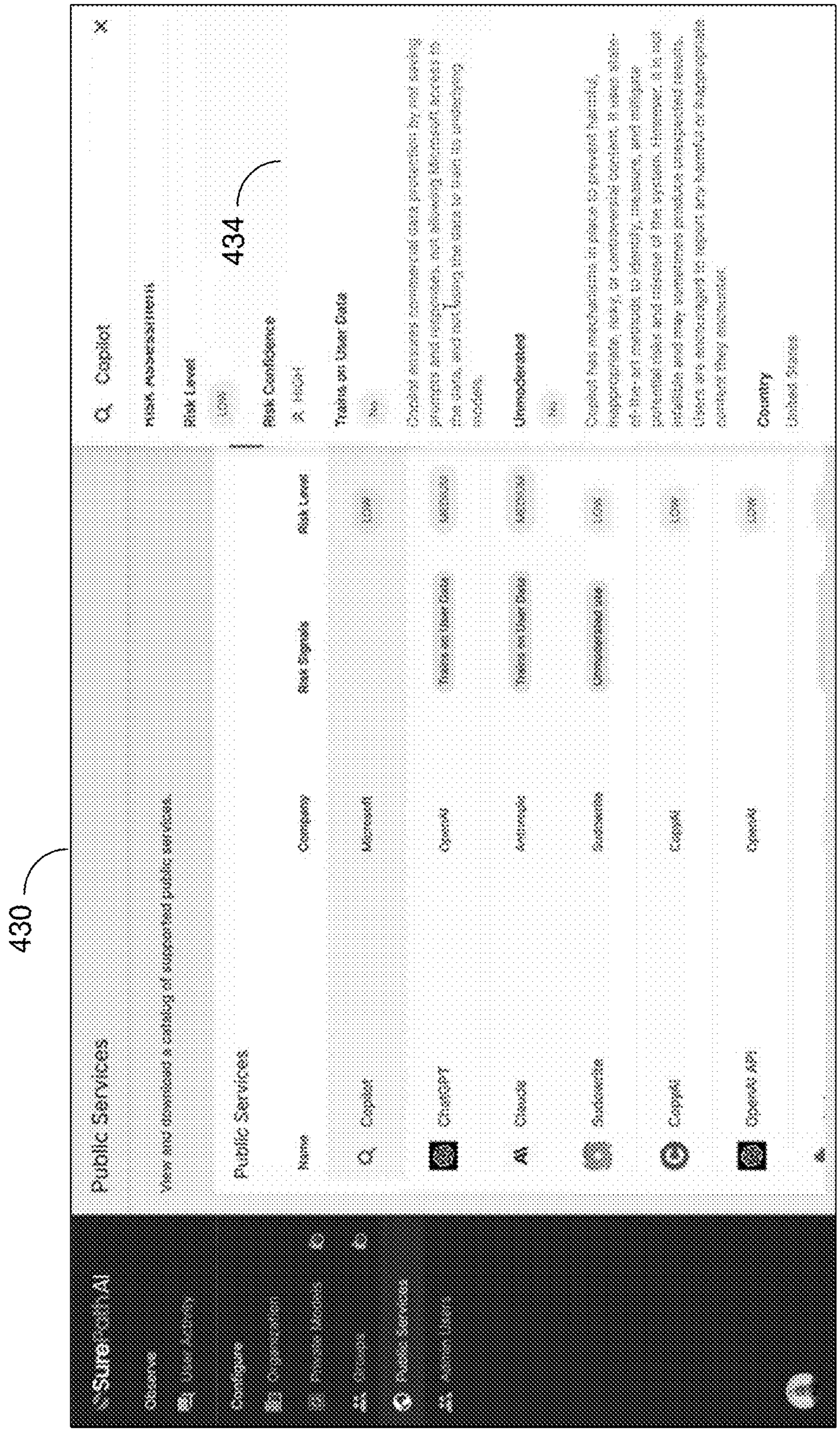
FIG. 4D depicts further aspects of the GUI indicating service specific information of the first service according to some embodiments.

Moving to FIG. 4D, a continued service panel 434 can be accessed in the GUI 430, for example, by scrolling down the service panel 432 from FIG. 4C. The continued service panel 434 includes risk identifiers associated with the selected service. These risk identifiers may include any one or more of the various risk considerations discussed in this disclosure. Particularly, in the example shown in FIG. 4D, the risk identifiers include an aggregate risk level, which may be classified for example among "low," "medium," and "high." The risk identifiers also include indications of the present and/or absent underlying risk signals associated with the selected service (e.g., indicating that the selected service does, or does not, train on user data and/or moderate input or output). Risk identifiers also include a risk confidence rating signifying confidence of the service differentiation engine 122 in the determinations of the aggregated risk level and/or the presence or absence of underlying risk signals (e.g., "low," "medium," or "high").

In some embodiments, the risk identifiers for the selected service are generated and/or supervised by a human user, and the human user may set the risk confidence rating based on the human user's own confidence in the other risk identifiers. In some embodiments, though, referring back to FIG. 4A, the service differentiation engine 122 includes a service discovery engine 404 configured to automatically determine risk identifiers and/or other information associated with respective services included in the service registry 402. For example, upon receiving an indication of a new network service (e.g., a network service that has been added to the service registry 402 or otherwise made known by the service differentiation engine 122 by a service name, web location, and/or other identifying information), the service discovery engine 404 may automatically scrape various web resources to determine details of the new network service, including functional details from which the service discovery engine 404 determines risk identifiers to be recorded with the new network service in the service registry 402. These various web sources could include, for example, publicly available information from a publisher or developer of the service, technical reviews available over the Internet, and/or other sources.

Figure 4E:
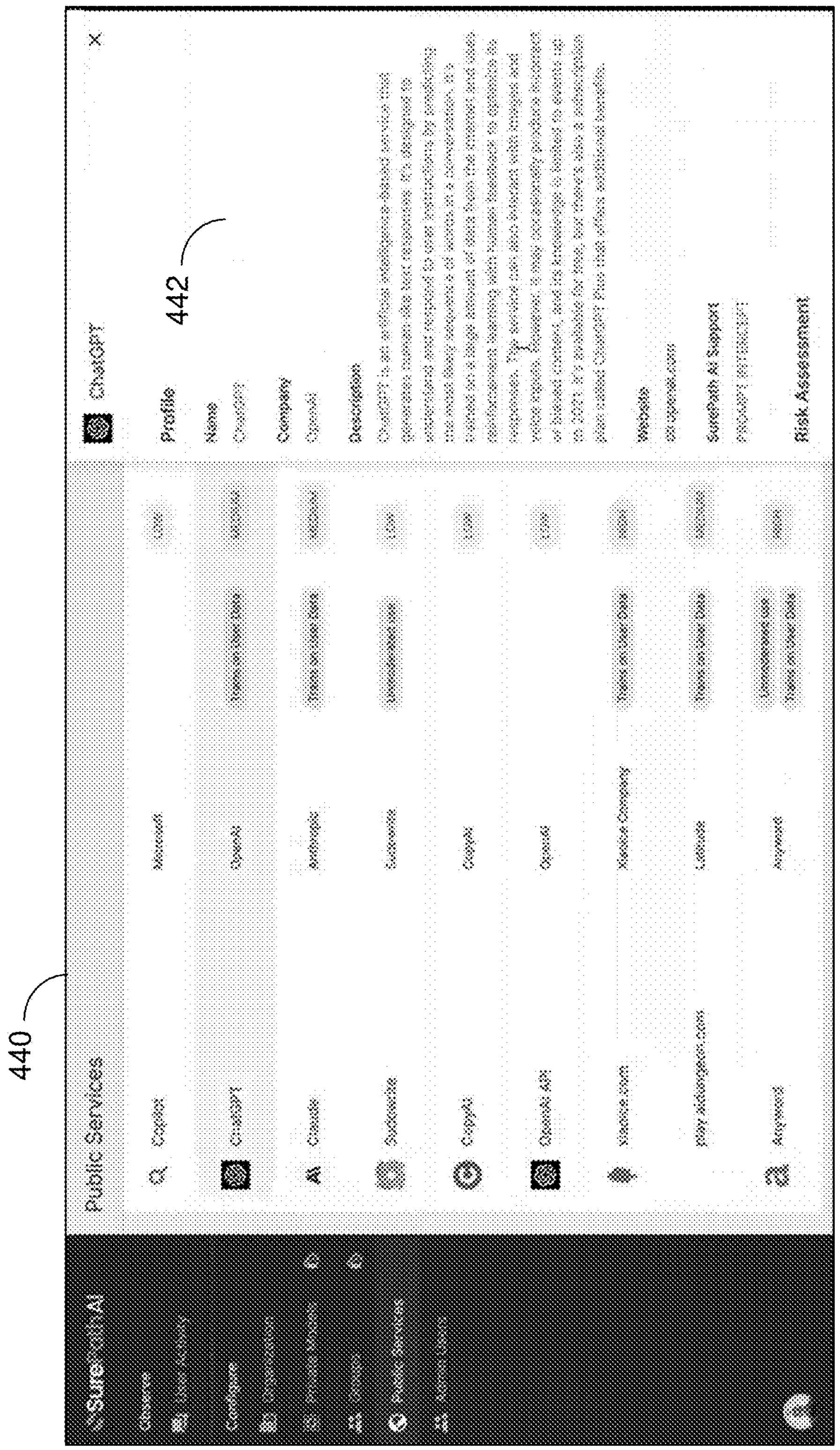
FIG. 4E depicts still another example GUI indicating service specific information corresponding to a second service in the service registry according to some embodiments.
Figure 4F:
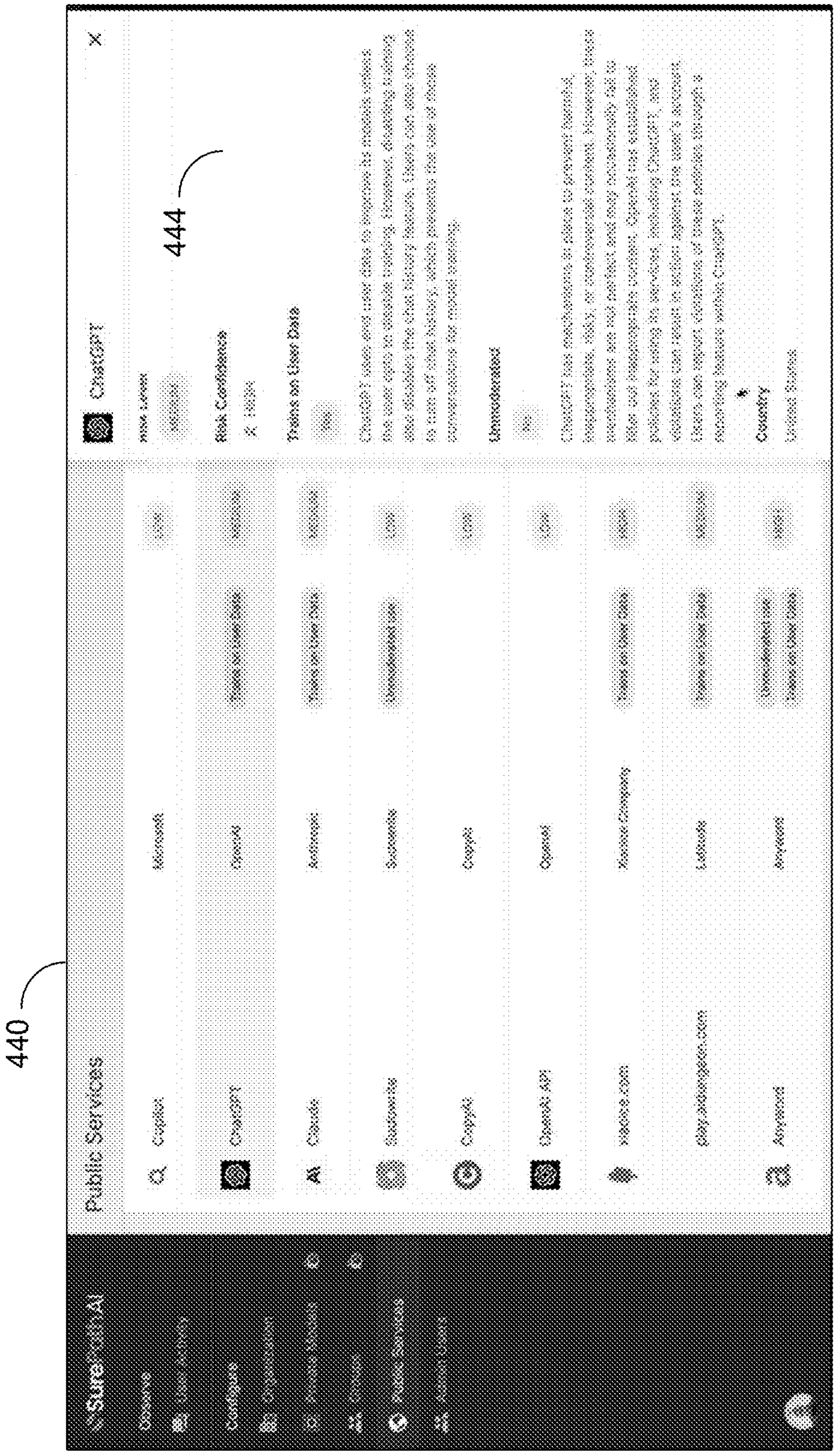
FIG. 4F depicts further aspects of the GUI indicating service specific information of the second service according to some embodiments.

Analogous identifiers of risk are obtained and displayed for every service from the list of public services 414 from FIG. 4B. To provide another example, FIGS. 4E and 4F depict another graphical interface 440 associated with display of service specific information associated with a second service from among the list of public services 414. In FIG. 4E, a first service panel 442 for the second service displays a name, developer/publisher, description, website for the service, etc. In FIG. 4F, a second, continued service panel

444 for the second service displays corresponding risk identifiers associated with the second service. As is evident from FIG. 4F, the risk identifiers for the second service, including the aggregated risk level and the underlying risk signals, differ from those of the first service as depicted in FIG. 4D.

It should be appreciated that, although the operations of the service differentiation engine 122 are detailed with respect to the GUIs of FIGS. 4B-4F, various operations of the service differentiation engine 122 do not necessarily involve display of the GUIs of FIGS. 4B-4F and/or another other GUIs to the user. For example, although selection of one or more network services in a particular use case (e.g., to service a request) may involve the information described with respect to the GUIs of FIGS. 4B-4F, the selection of one or more network services may not involve display of the GUIs to the user. Particular elements depicted in the GUIs of FIGS. 4B-4F may, however, be displayed to various users in the enterprise data management and monitoring system 100 where those particular elements are relevant. For example, upon selection of an approved network service or combinations of network services for a particular use case, information displayed to a user of the client device 126 may include indications of the selected network service(s), relevant risk determinations associated with the selected network service(s), recommendations or guidelines for using the selected network service(s), risk factors that led to one or more other network services not being selected for the particular use case, etc. Moreover, the GUIs described in the foregoing may be accessed by users having administrative roles with respect to the enterprise data management and monitoring system 100, e.g., viewing and managing lists of the network services 128, defining the roles and responsibilities of users, etc.

Taken as a whole, the service registry 402 provides a means of differentiating the respective risks associated with use of the various network services potentially available to an enterprise. The enterprise may use these respective risk identifiers, for example, to define policies based upon which the service differentiation engine 122 (alone, or in combination with another engine(s), e.g., the policy engine 110) is to select one or more network services for use to service any request to an intended network service originating from a client device in the enterprise. Accordingly, the service differentiation engine 122 includes a risk policy tool 406 that may enable an administrative user(s) in the enterprise, for example, to define, view, and/or enforce service risk policies. The risk policy tool 406, may, for example, include various user interfaces and/or other functionalities, and may be communicatively connected to the service registry 402. Policies defined via the risk policy tool 406 may be stored along corresponding services in the service registry 402, and may accordingly be used to monitor and/or manipulate the use of any service defined therein upon said service being identified as an intended network service for a request or as an approved network service to be used to service the request.

First and perhaps most generally, a policy generated via the risk policy tool 406 can include a policy to include or exclude any one or more network services from use by the enterprise data management and monitoring system 100 as a whole. For example, an administrative user (administrator) may define that the enterprise data management and monitoring system 100 is not to use (and thus, must redirect requests away from) any network service based upon a threshold aggregated risk level (e.g., to prevent use of services with a risk level of "high," or in a stricter implementation, an aggregated risk level of either "medium," or "high"). Alternatively, the administrator may define that the enterprise data management and monitoring system 100 is not to use any network service that is characterized by a particular underlying risk signal. Still alternatively, the administrator may prevent use of network services for which the aggregated risk level, or the presence/absence of a particular underlying risk signal, is not associated with at least a threshold confidence level (e.g., if the service differentiation engine 122 does not have a "high" confidence that a given network service has an aggregated risk level of "low," the given network service cannot be an approved network service).

Still additionally, policies generated via the risk policy tool 406 can include policies setting forth which service(s) are to be selected to service a request when an intended network service is not permitted to be used. For example, perhaps most broadly, the administrator may define a particular approved network service to be used as a replacement for a particular intended network service, such that all requests of the user directed to the particular intended network service are intercepted and redirected to the particular approved network services. Still yet additionally or alternatively, policies generated via the risk policy tool 406 can include policies setting forth if and how a request must be altered before provision to a given network service(s). In such cases, the service differentiation engine 122 and/or another engine(s) may, upon receiving outbound network traffic from a client device 126, generate a destination specific dataset for a given approved network service based upon the outbound network traffic, the approved network service, the intended network service, risk identifiers for the approved and/or intended network services, and/or risk policies defined via the risk policy tool 406.

In some embodiments, policies generated via the risk policy tool 406 may include policies defining actions to be taken based upon a combination of (1) the risk assessment(s) of the one or more network services that are requested and/or used to service a request, and (2) the content of the request itself. That is, for example, a first one or more network services may be permitted to receive and/or operate upon a particular set of data, whereas a second one or more network services may not be permitted to receive and/or operate upon the same set of data.

Still yet additionally or alternatively, the administrator may define policies indicating which network services are permitted to be used in combination with other services to service a single request. For example, the administrator may define that a first service with a "medium" aggregated risk level may only be combined with other services with a "low" aggregated risk level.

Any of the policies described herein may be still further tailored, e.g., to apply only to policies from a particular user(s), user role(s), client device(s), physical location(s), web location(s), time(s) or date(s), etc. As is evident from the above, the potential alterations and combinations of these policies present myriad potential data sensitivity policies and enforcement mechanisms for a given enterprise.

In operation, the service differentiation engine 122 may interact with the other engines of the enterprise data management and monitoring system 100 to select an approved network service(s) and otherwise monitor or manipulate aspects of a request based upon risk associated with respective network services. Particularly, as depicted in FIG. 4A, a service selection engine 408 of the service differentiation engine 122 may be configured to interact with the other engines of the enterprise data management and monitoring system 100 to determine a network service(s) defined via the service registry 402 and/or the service discovery engine 404, and enforce use of the determined network service(s) according to policies defined via the risk policy tool 406.

For example, recalling the previous discussion with respect to FIGS. 1A, 1B, and 2A-2C, the interception engine 108 may intercept outbound traffic indicating a request from a client device 126. The policy engine 110 may parse the outbound network traffic to determine an intended network service to which the outbound network traffic is directed by the client device. The service selection engine 408 (and/or another engine(s)) may locate the intended network service in the service registry to identify one or more risk identifiers of the intended network service (e.g., aggregated risk level, risk confidence level, and/or presence or absence of an underlying risk signal(s)). The service selection engine 408 (and/or another engine(s)) may determine an approved network service for the request from the service registry based on one or more risk identifiers corresponding to the approved network service and the intended network service. The policy engine 110 may transmit an outbound dataset to the approved network service to service the request. Moreover, any of the other various functions described herein may be performed with respect to the request, including for example traffic normalization, dataset transformation, portal engine operations, monitoring/manipulation of inbound network traffic from the approved network service(s) responding to the request, etc.

Figure 4G:
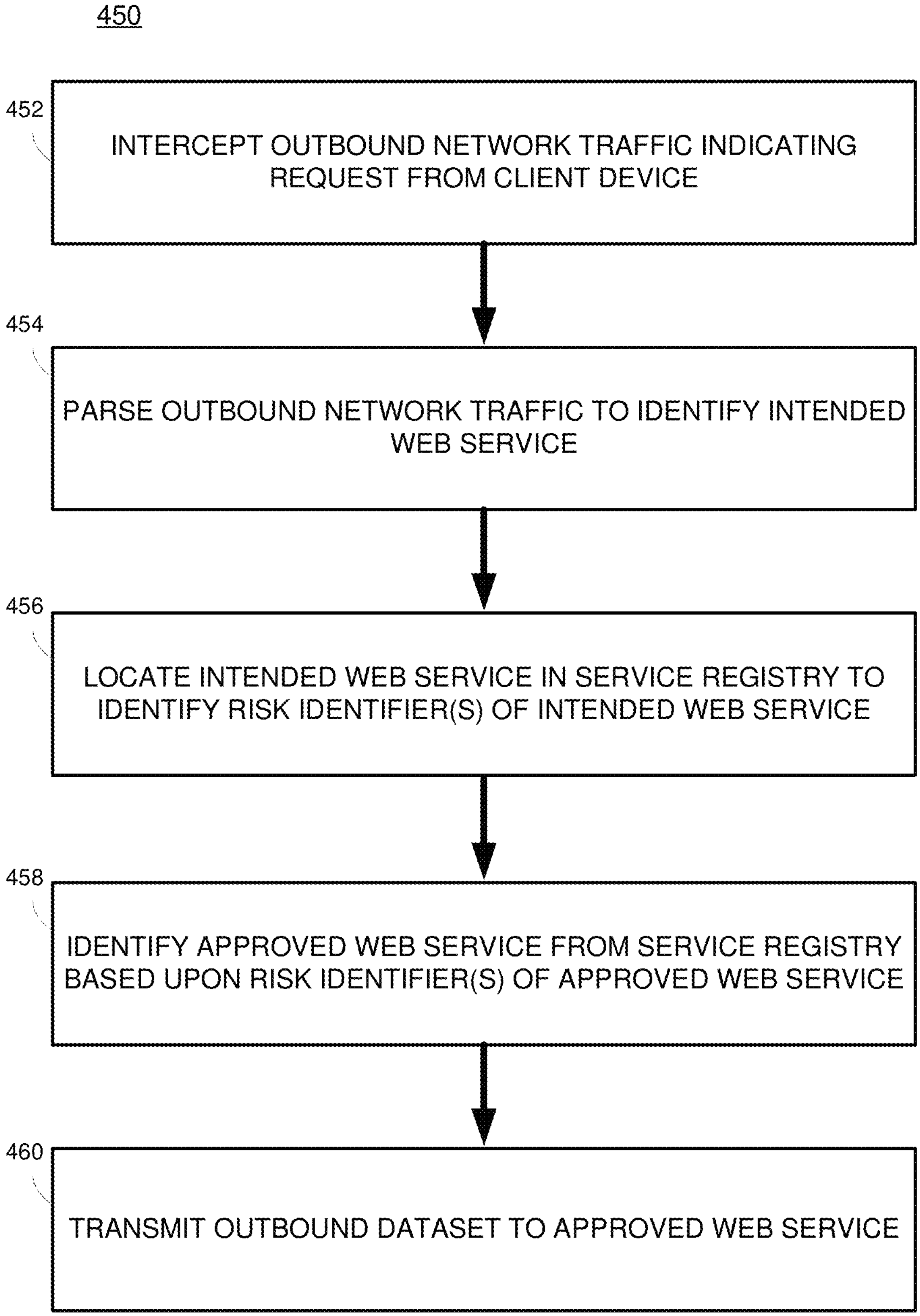
FIG. 4G is a flow diagram of another example method according to some embodiments.

To describe further example use cases, FIG. 4G depicts a block diagram of an example method 450 performed via one or more processing units and associated with differentiation of network services based on risk factors in view of the foregoing portions of this disclosure. The method 450 may be performed, for example, by the enterprise data management and monitoring system 100, and particularly via the service differentiation engine 122 (e.g., operating in combination with the policy engine 110 and/or other portions of the enterprise data management and monitoring system 100). Particularly, the method 450 may be performed via one or more processing units (e.g., one or more processing units 104 of FIG. 1A), which may execute computer executable instructions stored at one or more memories (e.g., the memory unit 106). In some embodiments, one or more non transitory computer readable media store instructions that, when executed via one or more processing units, cause the enterprise data management and monitoring system 100 to perform actions of the method 450. In some embodiments, at least some actions of the method 450 may be performed by a client device of an enterprise user (e.g., client device 126) which may for example store and/or retrieve the service registry 402 and which may be configured to execute instructions to service requests based on the concepts described herein.

At block 452, the method includes intercepting outbound network traffic indicating a request from a client device. The outbound network traffic may, for example, be intercepted by a network communication interface.

At a block 454, the method 450 includes parsing the outbound network traffic to determine an intended network service to which the outbound network traffic is directed by the client device.

At a block 456, the method 450 includes locating the intended network service in a service registry to identify one or more risk identifiers of the intended network service. The service registry may, for example, be stored locally, or at least a portion of the service registry may be obtained via network communications (e.g., using the network communication interface).

At a block 458, the method 450 includes determining an approved network service from the service registry based on a further one or more risk identifiers of the approved network service. Specifically, the approved network service is determined based at least on the intended network service and the one or more risk identifiers corresponding to the approved network service. The approved network service may include the intended network service, and/or another network service(s).

At a block 460, the method 450 includes transmitting an outbound dataset to the approved network service to service the request.

In some embodiments, the method 450 further includes parsing the outbound network traffic to identify the request. In these embodiments, the determining of the approved network service may be further based on the identification of the request.

In some embodiments, the method 450 further includes generating the outbound dataset based on contents of the outbound network traffic using a data processing schema that is associated with the approved network service. Thus, transmitting the outbound dataset may include transmitting a dataset generated via the method 450, and/or transmitting at least a portion of the outbound network traffic unaltered. In some embodiments, where the method 450 includes generating the outbound dataset based on contents of the outbound network traffic, the generating may additionally or alternatively be based on the further one or more risk identifiers of the approved network service.

In some embodiments, determining the approved network service includes determining a plurality of approved network services from the service registry. In these embodiments, transmitting the dataset may include transmitting respective portions of the dataset to respective ones of the plurality of approved network services to service respective portions of the request. Transmitting the respective portions of the outbound dataset to the respective ones of the plurality of approved network services may include identifying the respective portions of the outbound dataset for transmission to the respective ones of the plurality of approved network services based upon risk identifiers of the respective ones of the plurality of approved network services, and/or contents of the request or portions thereof.

In some embodiments, the method 450 further includes storing network session data, e.g., at one or more computer memories. The network session data may document (indicate) the client device, the approved network service, the intended network service, an indication of contents of the outbound network traffic, and/or the outbound dataset. Moreover, in these embodiments, the method 450 may still further include intercepting inbound network traffic from the approved network service via the network communication interface, recalling the network session data from the data storage system based on contents of the inbound network traffic, and/or transmitting a recipient dataset to the client device via the network communication interface based on the inbound network traffic. Still yet further, the method 450 may include generating the recipient dataset based on contents of the inbound network traffic, the network session data, and the further one or more risk identifiers associated with the approved network service. That is, transmitting the recipient dataset may include transmitting data generated via the method 450 and/or generating at least a portion of the inbound dataset unaltered.

In some embodiments, the method 450 further includes providing a graphical interface for display at the client device. The graphical interface may indicate the approved service, the intended network service, the one or more risk identifiers of the intended network service, the further one or more risk identifiers associated with the approved network service, the request, the outbound network traffic, the transmitted dataset, and/or various other information associated with the method 450.

In some embodiments, the method 450 further includes obtaining an indication of a new network service previously not included in the service registry, automatically determining an additional one or more risk identifiers of the new network service (e.g., via AI and/or ML methods), and/or automatically adding an indication of the new network service and the additional one or more risk identifiers to the service registry.

In some embodiments, the method 450 further includes monitoring use of a plurality of used network services in the service registry to service a plurality of requests. In these embodiments, the method 450 may also include generating an aggregated risk determination of the enterprise based upon corresponding risk identifiers from the service registry associated with respective ones of the plurality of used network services originated by users in an enterprise.

In various embodiments, the method 450 may include still additional, fewer, and/or alternate actions, including for example various actions described in this disclosure. Moreover, the order of actions of the method 450 may differ from the order depicted in FIG. 4G, in some embodiments.

Data Loss Prevention Techniques

To eliminate or at least mitigate the risk of unwanted disclosure and/or corruption of sensitive data of the enterprise herein, techniques are proposed herein by which the enterprise can define sensitivity of enterprise data by manually and/or automatically labeling any and all enterprise data with sensitivity metrics indicating whether any data element can be shared to any one or more of the network services 128. Even more particularly, the enterprise may define how, when, where, why, and/or by whom any particular data element (or combination of data elements) may be shared to (e.g., included in a request to) any network service 128 or combination of network services 128.

At a high level, data loss prevention techniques provided herein may represent any request to a network service (e.g., to a network service 128) as one or more vectors in an embedded space. Sensitive data of the enterprise, e.g., privileged documents, intellectual property, personal information and the like, can likewise be represented via stored vectors corresponding to the same embedded space. By comparing the vector(s) of the request to the vectors to the stored vectors, systems and methods herein may determine whether the request contains sensitive data of the enterprise, and perform various actions in response based on data sensitivity policies defining where, how, and by whom the sensitive data is permitted to be shared to the network service. Systems and methods may, for example, block the request from being provided to the network service, selectively redact the sensitive data within the request, and/or utilize a different one or more of the network services 128 to service the request.

As will be further understood from the following discussion, these techniques serve to eliminate or mitigate the risk of disclosure or corruption of sensitive enterprise data through unwanted or impermissible sharing of the sensitive enterprise data to the network services 128. Particularly, these techniques reduce risk with respect to use of the publicly available AI or ML services 128B, which may not be owned by the enterprise and hence present increased concerns regarding confidentiality of data.

These data loss prevention techniques will be discussed with respect to FIG. 5A, which is a block diagram of example aspects of the data loss prevention engine 120 of FIG. 1A. It should be appreciated that these aspects are provided as example only, and the data loss prevention engine 120 as implemented in the enterprise data management and monitoring system 100 may include additional, fewer, and/or alternate aspects. The various aspects of the data loss prevention engine 100 will be detailed also with reference to FIGS. 5B-5G, which depict example graphical user interfaces (GUIs) associated with operation of the data loss prevention engine 100. The GUIs of FIGS. 5B-5G may be displayed, for example, by the client device 126, and may be controlled for example via touchscreen interactions, mouse/keyboard input, voice interaction, and/or other suitable forms of user input.

Figure 5A:
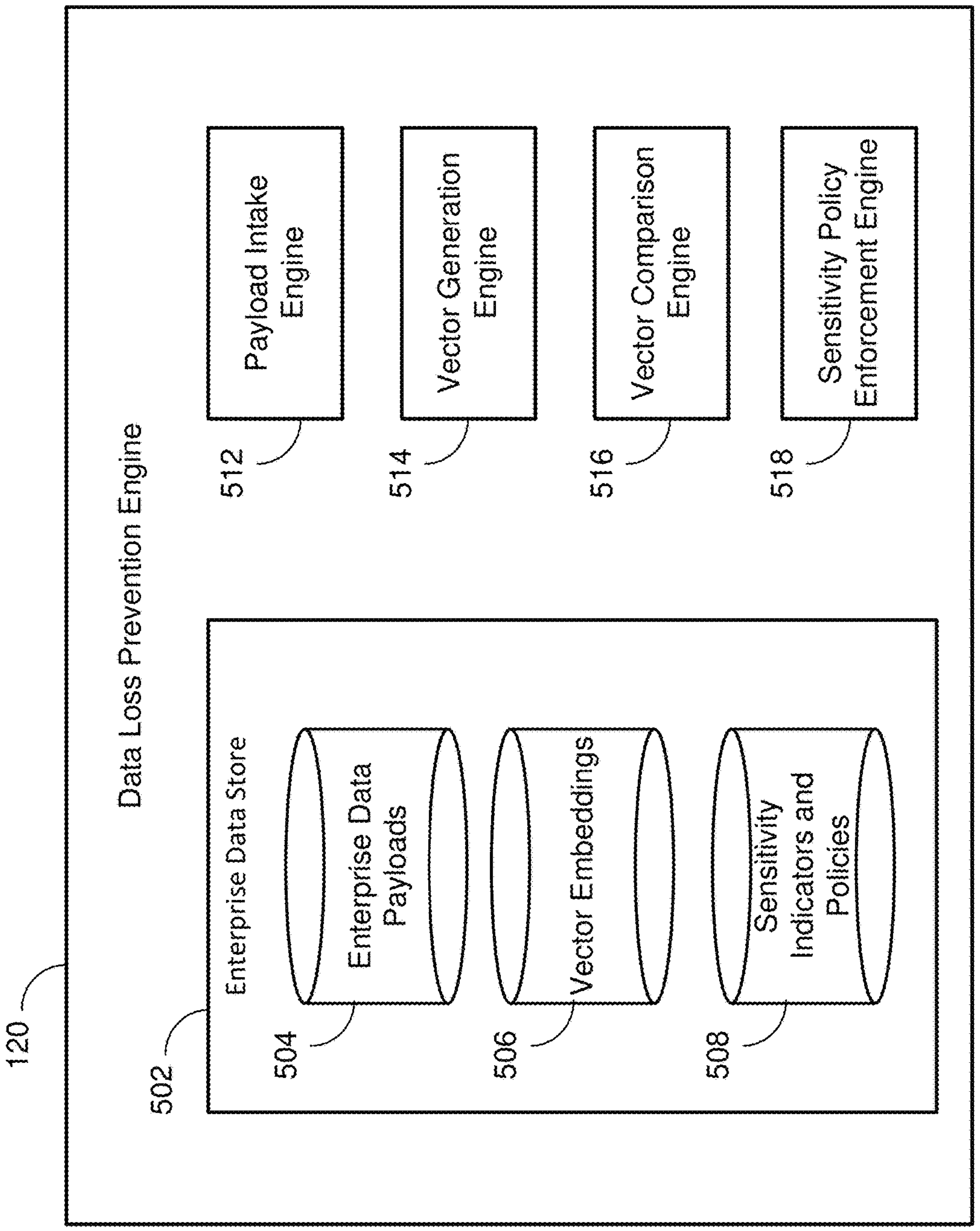
FIG. 5A depicts a block diagram of a data loss prevention engine according to some embodiments.

As depicted in FIG. 5A, the data loss prevention engine 120 includes an enterprise data store 502. Aspects of the enterprise data store may, for example, be located in the data storage 124 from FIG. 5A, and/or in another storage location(s) belonging to or otherwise accessible by the enterprise. The enterprise data store 502 includes enterprise data payloads 504. A particular enterprise data payload may, for example, be (or otherwise describe) a web site or web page, a database, a document (e.g., a. pdf file, a .docx file, a .txt file, a scanned document, etc.), an image or album of images, a video, configuration data of a computer device or network, and/or another discrete set of data owned or managed by the organization. Each enterprise data payload 504 is made up of one or more data elements. A particular data element may, for example, be (or otherwise describe) a page, paragraph, sentence, phrase, word or image in a document, a portion of a database (e.g., a particular table, row, column, field, range of fields, etc.), an image, a frame of a video, or some other discrete element. In short, an enterprise data payload 504 may be characterized as containing as few as one but also potentially many data elements. Moreover, the numbers of and sizes of data elements contained therein may adapt based on the evaluation of the relative sensitivity of portions of data comprising the enterprise data payload 504.

In embodiments, the data loss prevention engine 120 includes one or more sub-engines configured obtain or locate enterprise data payloads 504. For example, as depicted in FIG. 5A, the data loss prevention engine may include a payload intake engine 512 configured to (e.g., containing instructions to) obtain indications of data payloads of the enterprise including documents, images, videos, databases, etc. (e.g., by acquiring the payloads themselves, or by obtaining and storing an indication of the locations of the payloads in another storage location(s)). In embodiments, the payload intake engine 512 is configured to access data payloads of the enterprise automatically, e.g., via web scraping, searching one or more computer systems, and/or automatically obtaining or intercepting new data payloads added or updated at one or more computer systems of the enterprise. Additionally or alternatively, a human user (e.g., an administrator) may manually provide indications of data payloads to payload intake engine 512 to cause the payload intake engine 512 to add the data payloads to the enterprise data payloads 504.

The enterprise data store 502 additionally includes respective semantic vector embeddings 506 corresponding to the enterprise data payloads 504 and the data elements contained therein. A semantic vector embedding 506 corresponding to any data element included in an enterprise data payload 504 represents a meaning (embedding) of the data element as a vector. Each vector may have a number of dimensions n (e.g., one, two, three, four, five, ten, twenty or more dimensions). Values along a particular dimension of a vector embedding may correspond to degrees of association of the data element to a corresponding entity such as a word, document, field, concept, idea, object, person, place, electronic document, database, database entry, word, etc. Values along each particular dimension may, for example, be values normalized to range as decimal values between zero (0.0) and one (1.0). The meanings of data elements in terms of association with each entity are thereby represented as respective points in an embedded space (e.g., multidimensional space), from which comparisons between the respective points can be used as a proxy for comparisons of the data elements themselves (e.g., to produce similarity determinations as will be described herein). Techniques for generating a vector embedding for an enterprise data payload 504 (and/or for a particular data element(s) therein) can include various techniques known in the field, including for example AI and/or ML models such as convolutional neural network (CNN) models, transformer models (large language models, large multi-modal models, etc.), natural language processing (NLP) models, sentiment classification models, etc.

In embodiments, the data loss prevention engine 120 includes a vector generation engine 514 configured to generate the vector embeddings 506 automatically based on the obtained/located enterprise data payloads 504. For example, the vector generation engine 514 may be configured to generate one or more vector embeddings 506 for any given enterprise data payload 504 automatically upon the enterprise data payload 504 being added or indicated to the enterprise data store 502. Each of the generated vector embeddings 506 may conform to a first vector structure defining a number of dimensions n and the entity to which each dimension corresponds. In embodiments, all of the generated vector embeddings 506 do not necessarily use an identical vector structure (i.e., the vectors embeddings 506 may have partially or entirely different respective sets of dimensions). In any case, each enterprise data payload 504 (and, in embodiments, particular data elements therein) are represented by a corresponding vector embedding(s) 506, e.g., based on instructions from the payload intake engine 512 to generate the vector embedding(s) 506 upon obtaining the enterprise data payload 504.

The enterprise data store 502 still additionally includes sensitivity indicators and policies 508 corresponding to the vector embeddings 506 and their corresponding enterprise data payloads 504 or data elements therein ("corresponding embeddings and data"). At a high level, the sensitivity indicators and policies 508 label the corresponding embeddings and data as being sensitive information of the enterprise for which sharing to certain network services 128 (e.g., publicly available network services 128) may be blocked or limited. The sensitivity indicators and policies 508 may, for example, define a type of the corresponding data, and/or a level of sensitivity of the corresponding data (e.g., such). Types of sensitive data to which these techniques apply may include, for example, intellectual property (unpublished patent applications, invention disclosures, trade secrets, etc.), sensitive correspondence (e.g., via email and/or other applications), private financial information (e.g., unpublished information exposing expenses, revenue, profit, debt, etc.), legal documents (e.g., contracts, privileged legal counsel, etc.), employee identifying information (e.g., names, addresses, social security numbers, compensation information, health information, etc.), enterprise device or computer network configuration information, and/or other information the enterprise may intend to label as sensitive for one or more reasons. The level of sensitivity for a particular data may be labeled, for example, to make sharing of the data to network services 128 more or less restricted as compared to other identified sensitive data.

The stored sensitivity indicators and policies 508 further include sensitivity policies that, at a high level, define whether data is permitted be shared to the network services 128, and if so, the manner in which the data is permitted to be shared to the network services 128. The data loss prevention engine 120 may apply these sensitivity policies to data elements or payloads individually (e.g., uniquely associating a policy with a particular data element or payload), and/or at a group level (e.g., defining a policy for all data labeled with a particular data sensitivity type, data sensitivity level, or combination thereof). Non-limiting examples of these policies are provided below.

In embodiments, a sensitivity policy included in the sensitivity indicators and policies 508 indicates which network services 128 are permitted to receive a particular data payload 504 or data element therein in a request. The policy may define, for example, that certain data can be shared in a request to private AI or ML services 128C that are developed, published, owned, and/or managed by the enterprise, but cannot be shared in a request to customer provided network services 128A and/or publicly available AI or ML services 128B. As another example, the policy may forbid certain data from being shared in a request to a particular network service 128 based on a data sensitivity consideration particular to the network service 128 (e.g., because the network service is known to train/update an AI or ML model based on user requests, or based upon other concerns regarding the use of a particular network service 128, examples of which will be provided in subsequent sections of this disclosure).

Additionally or alternatively, in embodiments, a sensitivity policy may define permissions of particular users with respect to the corresponding data payload 504 or data element therein. For example, a particular user or role within the enterprise may be permitted to share certain data in requests to network services 128 whereas other users or roles within the enterprise are not permitted to share the same data.

Still additionally or alternatively, a sensitivity policy may define location- and/or time-based conditions for sharing the corresponding data payload 504 or data element therein to one or more network services 128. For example, a user may be permitted to share certain data to a particular network service 128 at a first time, from a first location, and/or from a particular client device and/or network, whereas the same user may not be permitted to share the same data to the same network service 128 at a different time, different location, and/or from a different client device and/or network.

In embodiments, a sensitivity policy may define permissions for sharing of first data to network services based upon whether the request in which the data is included also includes certain second data. For example, a request to a network service containing a first identifying data of a user (e.g., a name of an employee in the enterprise) may be allowed in some scenarios, but not allowed in scenarios where the request also includes second identifying data of the user (e.g., compensation information, social security number, and/or health information of the same employee).

In some cases, sensitivity policies may be applied conditionally based on an intent of a request. For example, a sensitivity policy may define that use of a particular one of the network services 128 is allowed for a request having a first intent (e.g., generating code, downloading a document, generating a summarized report, and/or other intents as described with respect to FIGS. 3A-3C), but not for a request having a second, different intent.

In any case, the sensitivity policies in the stored sensitivity indicators and policies 508 may define any of various actions to be taken based upon whether a corresponding data payload (or data element) is identified in a request to an intended network service. In some scenarios, a request containing sensitive data of the enterprise may be blocked, i.e., not permitted to reach the intended network service to service the request, thereby preventing the possibility of compromising the sensitive data through the network service. In some scenarios, systems and methods herein may identify a different, approved network service(s) to which to direct the request based on the request containing sensitive data. For example, if an intended network service for the request is one of the publicly available AI or ML services 128B which cannot be trusted with sensitive data of the enterprise, the systems and methods herein may redirect the request to one of the private AI or ML services 128C capable of servicing the request.

Still additionally or alternatively, in some scenarios, the systems and methods may respond to the inclusion of sensitive data of the request by selectively redacting the request, e.g., by removing sensitive data and/or replacing the sensitive data with "dummy data" that does not reveal sensitive information of the enterprise. The redacted request may then be permitted to proceed to an approved network service (e.g., the intended network service, or a different service if the request was also redirected). The systems and methods herein may generate and store network session data indicating the redactions to the request such that, upon receiving inbound network traffic from the approved network service in response to the request, the systems and methods herein may restore the redacted information (e.g., by swapping the dummy data (or output produced by the service based on the dummy data) with the original information of the request).

Various combinations of the above-described sensitivity policies may be envisioned. For example, a sensitivity policy may define that a particular data payload(s) or element(s) may be shared to a first network service 128 by any user in the enterprise, but may be shared to a second network service 128 only by a privileged subset of users in the enterprise. As another example, a sensitivity policy may define that a request exposing a particular data payload(s) or element(s) to a first network service 128 is blocked, but a request exposing the same data payload(s) or element(s) to a second network service 128 is redacted to hide the data payload(s) or element(s) but otherwise allowed. As still another example, a sensitivity policy may define that a request that shares data having a particular sensitivity level or type (or more particularly, a specific data element) is to be allowed, unless the unless the request contains another particular data payload(s) or element(s) (or data having another sensitivity level and/or type), in which case the request is to be blocked or redacted.

Stored sensitivity indicators and policies 508 for any particular data payload 504 or data element therein may evolve over time. For example, a particular document describing intellectual property of the enterprise may be highly sensitive when the intellectual property has not been publicized outside of the enterprise. After publicizing of the intellectual property, though, the same enterprise data payload 504 or data element therein may be less sensitive (e.g., after filing/publishing of a patent application, or after a scheduled discussion of the intellectual property at a trade show). Accordingly, a particular sensitivity indicator or policy 508 applied to an enterprise data payload 504 or data element therein may be configured to automatically expire or change in sensitivity level at particular time, or after receiving an indication that a particular event has occurred elsewhere in the enterprise.

In some embodiments, an authorized user may manually add, revise, or remove the sensitivity indicators and policies applied to any enterprise data payloads 504 or portions thereof. Accordingly, the data loss prevention engine 120 may be configured to provide one or graphical interfaces to a user (e.g., at the client device 126 using the portal engine 112) to enable the user to view indications of the enterprise data payloads 504, vector embeddings 506, and sensitivity indicators and policies 508, and configure the sensitivity indicators and policies 508 to be applied to the corresponding enterprise data payloads 504 and vector embeddings 506 (or groups thereof).

Having obtained the enterprise data payload 504, vector embeddings 506, and sensitivity indicators and policies 508, the enterprise data store 502 can be used prepared for use in handling data sensitivity issues regarding requests to the network services 128. In embodiments, the vector generation engine 514 is configured to receive an indication of an intercepted request to an intended network service (e.g., via the interception engine 108 intercepting outbound network traffic 200 to a network service 128, as described with respect to the preceding figures). The vector generation engine 514 is configured to automatically generate one or more vector embeddings based on the request. For example, the vector generation engine 514 may parse the request, e.g., the outbound network traffic 200, to identify data elements therein and generate vector embeddings for the respective data elements (e.g., words, phrases, fields, values, images, database elements, etc.). Techniques for generating the vector embedding(s) for the request may be similar to those used in generating the vector embeddings 506 for the enterprise data payloads 504 (e.g., AI and/or ML models).

In embodiments, the request vector embedding(s) conforms to the first vector structure, e.g., the request vector embedding contains values in the dimensions n and only the dimensions n, such that the request vector embedding(s) are entirely comparable to the generated vector embeddings 506 that utilize the first vector structure. In other embodiments, at least some of the request vector embeddings do not conform to the first vector structure but conforms to a second vector structure that at least partially aligns with the first vector structure, i.e., include at least one but not necessarily all of the dimensions n, and possibly an additional dimension(s) not included in the first vector structure. Thus, in these embodiments, a request vector embedding having a second structure partially aligning with (but not matching) a first structure of a stored vector embedding 506 are comparable in a reduced embedded space comprising a shared portion of the dimensions n.

In any case, a vector comparison engine 516 compares the one or more vectors generated by the vector generation engine 514 based on the request (the "request vector embedding(s)") to the stored vector embeddings 506, respectively. The vector comparison engine 516 may use any one or more of various vector comparison algorithms, including for example a Euclidean distance, Manhattan distance, cosine similarity or inner product, dot product, and/or other approaches. In any case, comparison of any particular request vector embedding to any particular stored vector embedding 506 may produce a respective distance measurement indicative of the similarity (or lack of similarity) between the request vector embedding and the stored vector embedding (and thus, between the corresponding data element of the request and data payload/element stored at the enterprise data store 502. A smaller distance measurement, for example, may indicate greater similarity between the request data element and the data element stored at the enterprise data store 502.

The vector comparison engine 516 may determine whether a stored data element is included in the request by comparison of the distance between the corresponding stored vector embedding 506 for the stored data element and each request vector embedding to a predefined distance threshold. If the distance between the corresponding stored vector embedding 506 and any of the request vector embeddings meets or passes the distance threshold (e.g., is greater than or less than the threshold, whichever indicates greater similarity), the vector comparison engine 516 determines that the corresponding data element from the enterprise data store 506 was included in the request. Thus, based on respective comparisons of the request vector embedding(s) to the stored vector embeddings 506, the vector comparison engine 516 may determine what, if any, sensitive data of the enterprise ("discovered sensitive data") was included in the request.

Based on the determinations produced via the vector comparison engine 516, a sensitivity policy enforcement engine 518 of the data loss prevention engine 120 determines what data sensitivity policies are to be applied to the request. Specifically, in embodiments, the sensitivity policy enforcement engine 518 references the enterprise data store 502 to identify stored sensitivity indicators and policies 508 corresponding to the data stored enterprise data payloads 504 (or data elements therein) that the vector comparison engine 516 identified as being contained in the request based on the analysis of the outbound network traffic of the request. For example, if the corresponding stored sensitivity indicators and policies 508 for an identified data element indicate that the data element is not permitted to be shared to any of the network services 128, the sensitivity policy enforcement engine 518 may determine that the request is to be blocked or at least redacted. As another example, if the corresponding sensitivity indicators and policies 508 for the identified data element indicate that the data element is permitted to be shared to private AI or ML services 128C but not an intended publicly available AI or service 128B, the sensitivity policy enforcement engine may redirect the web request (or a particular sensitive portion thereof) to one of the private AI or ML services 128C. Still additionally alternatively, in various embodiments, the sensitivity policy enforcement engine 518 may enforce policy based on an identity/role/authorization of the user making the request, an identity of client device making the request, a location of the user and/or client device, a time of the request, one or more identified intents of the request, the presence of other sensitive data in the request (as indicated by other corresponding outputs of the vector comparison engine 516), and/or any other data sensitivity considerations described in this disclosure.

In some embodiments, the sensitivity policy enforcement engine 518 may require different confidence thresholds for application of different ones of the stored sensitivity indicators and policies 508, where a confidence that a given data element is included in the request is represented by the corresponding distance measurement calculated by the vector comparison engine 516. Applying a first data sensitivity policy may, for example, have a lower distance threshold corresponding to a greater degree of certainty that the corresponding enterprise data payload 504 (or data element therein) was included in the request, whereas applying a second, stricter data sensitivity policy may have a higher distance threshold, effectively applying the second sensitivity policy even if the output of the vector comparison engine 516 did not produce total confidence that the corresponding enterprise data payload 504 (or data element therein) was included in the request.

The data loss prevention engine 120 may implement still other techniques, in various embodiments. For example, the data loss prevention techniques may implement still other data sensitivity policies to block or redact a request that contains a particular word, phrase, image, computer file, etc.

To contrast the above-described techniques to existing data loss prevention techniques, typical techniques for identifying sensitive data are traditionally not specific to an enterprise and to the evolving sensitivity classification of particular data belonging to the enterprise. For example, to address the threat of use of a website endangering data and/or other security aspects of the enterprise, enterprise security software may simply block access to the website altogether. The techniques of this disclosure, on the other hand, conditionally allow use of network services 128 such as the publicly available AI or ML services 128B by assuring that the particular information shared to the network services 128 is shared in a permissible manner (e.g., to prevent sharing data when said data is considered sensitive, and to prevent the data from being shared by persons not authorized to do so).

In view of the description of FIG. 5A, FIGS. 5B-5G depict graphical user interfaces (GUIs) associated with an example use case where data loss prevention techniques of this disclosure are applied to a request to a network service 128 (e.g., a request to a publicly available AI or ML service 128B). The GUIs may be implemented, for example, at the client device 126 as described with respect to FIGS. 1A and 2A (e.g., based on instructions stored via one or more memories of the client device 126, and/or via one or more tangible, non-transitory computer readable media).

Figure 5B:
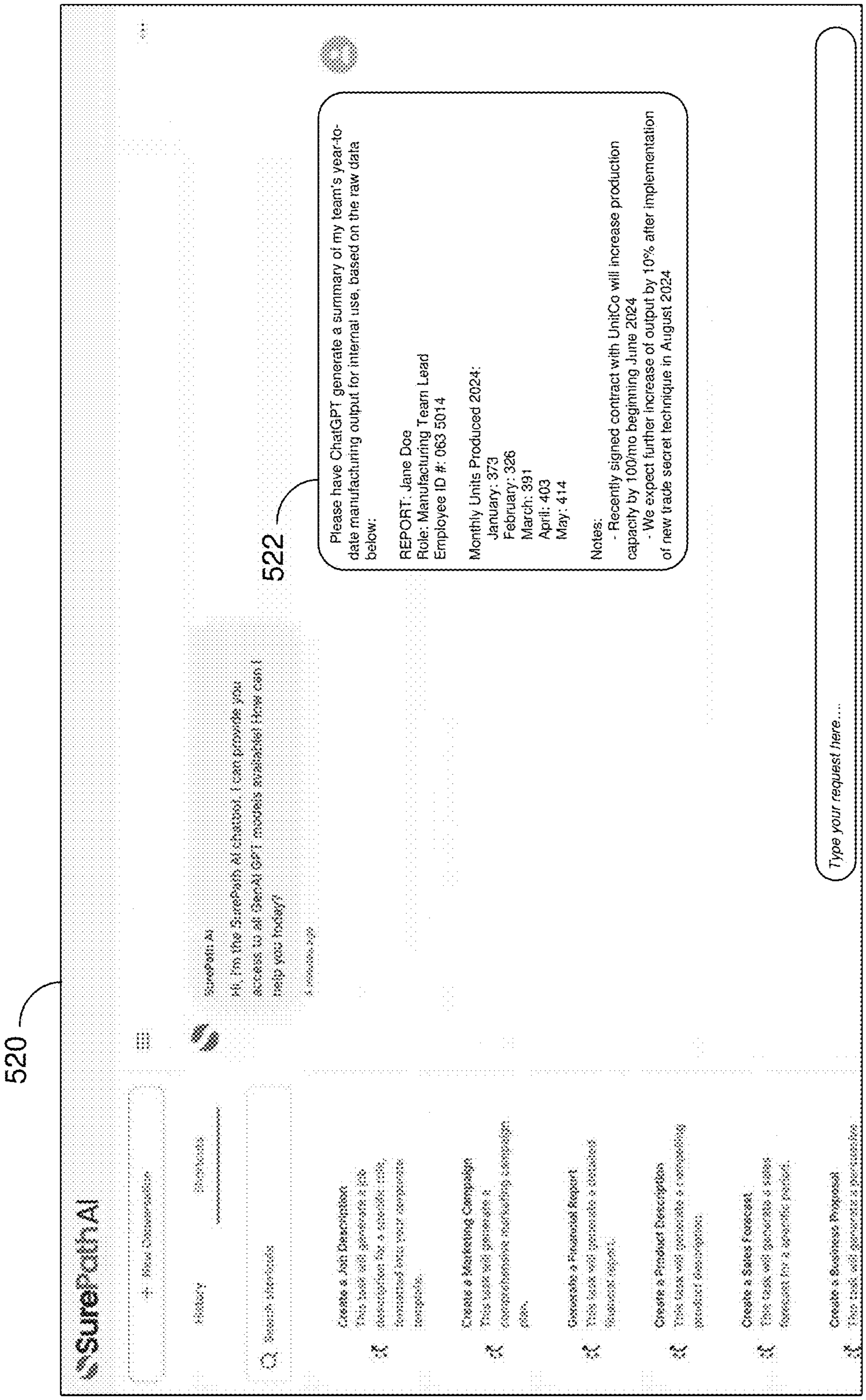
FIG. 5B depicts an example GUI indicating a request to a network service according to some embodiments.

As depicted first in FIG. 5B, a GUI 520 provides a chat assistant tool providing access to a number of network services 128 (e.g., generative AI-based services). The chat assistant tool may, for example, be configured to intercept and direct requests to network services based on the techniques of this disclosure. The user of the GUI 520 provides a prompt 522, requesting a network service 128 to generate a short summary of manufacturing output for a portion of an enterprise based on raw data and other notes provided by the user.

Figure 5C:
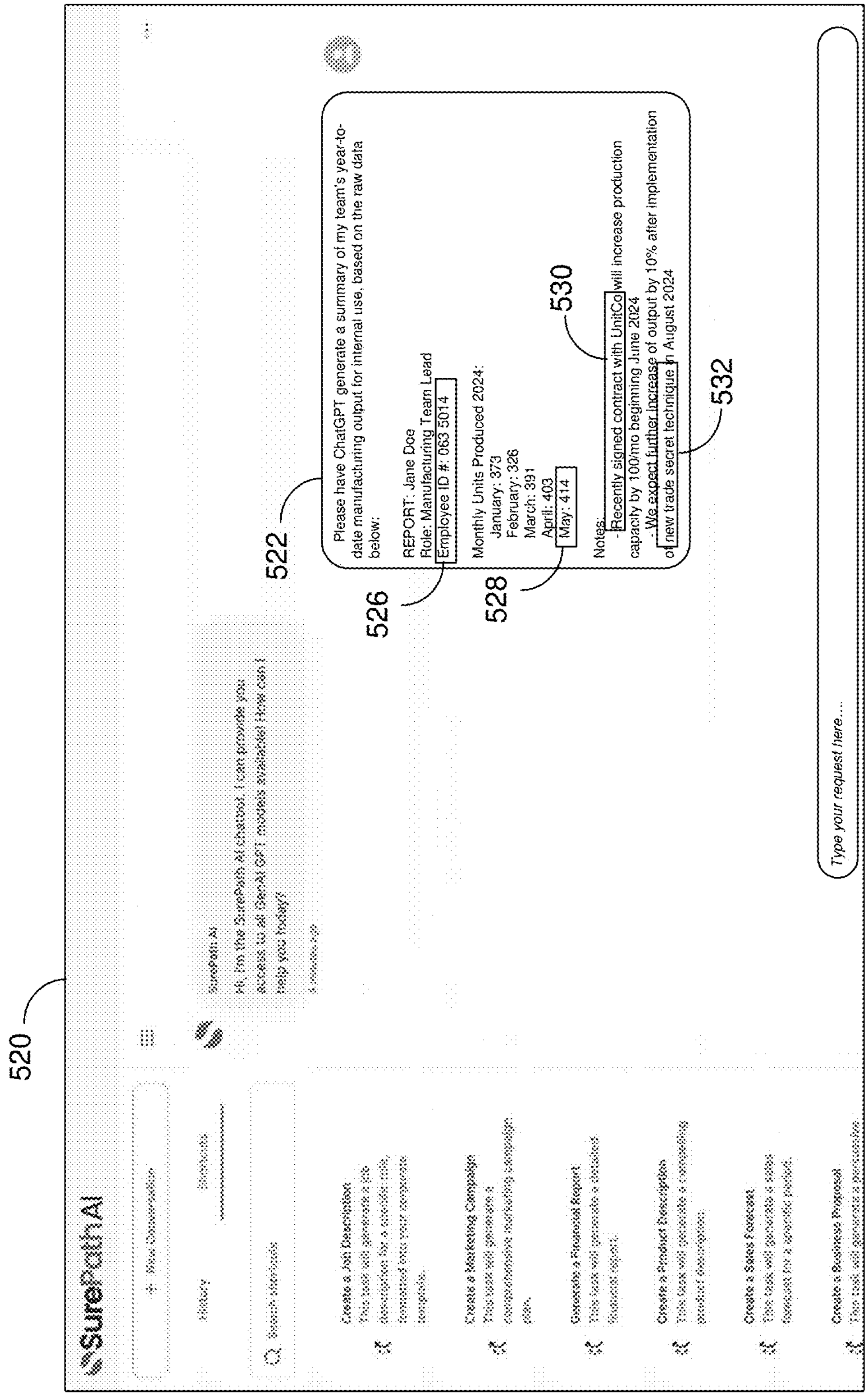
FIG. 5C depicts the example GUI of FIG. 5B indicating sensitive data of an enterprise according to some embodiments.

The prompt 522 includes various data that may be considered sensitive within the enterprise. FIG. 5C depicts indicators of the various potentially sensitive data within the prompt 522, including the user's employee identification number (indicator 526), a particular un-released manufacturing output for the month of May (indicator 528), an indication of a confidential business contract (530), and an indication of a protected trade secret (532). The data loss prevention engine 120 may have determined the presence of the sensitive data, for example, by using the vector generation engine 514 to generate vector embeddings based on the corresponding portions of the request 522, and by using the vector comparison engine 516 to compare the generated vector embeddings to stored vector embeddings 506 to identify the indicated data as sensitive data of the enterprise (based further on the stored sensitivity indicators and policies 508). In some embodiments, the GUI 520 may visually display the indicators 526, 528, 530, and/or 532 to the user, although in other embodiments the GUI 520 may not display one or more of the indicators.

Figure 5D:
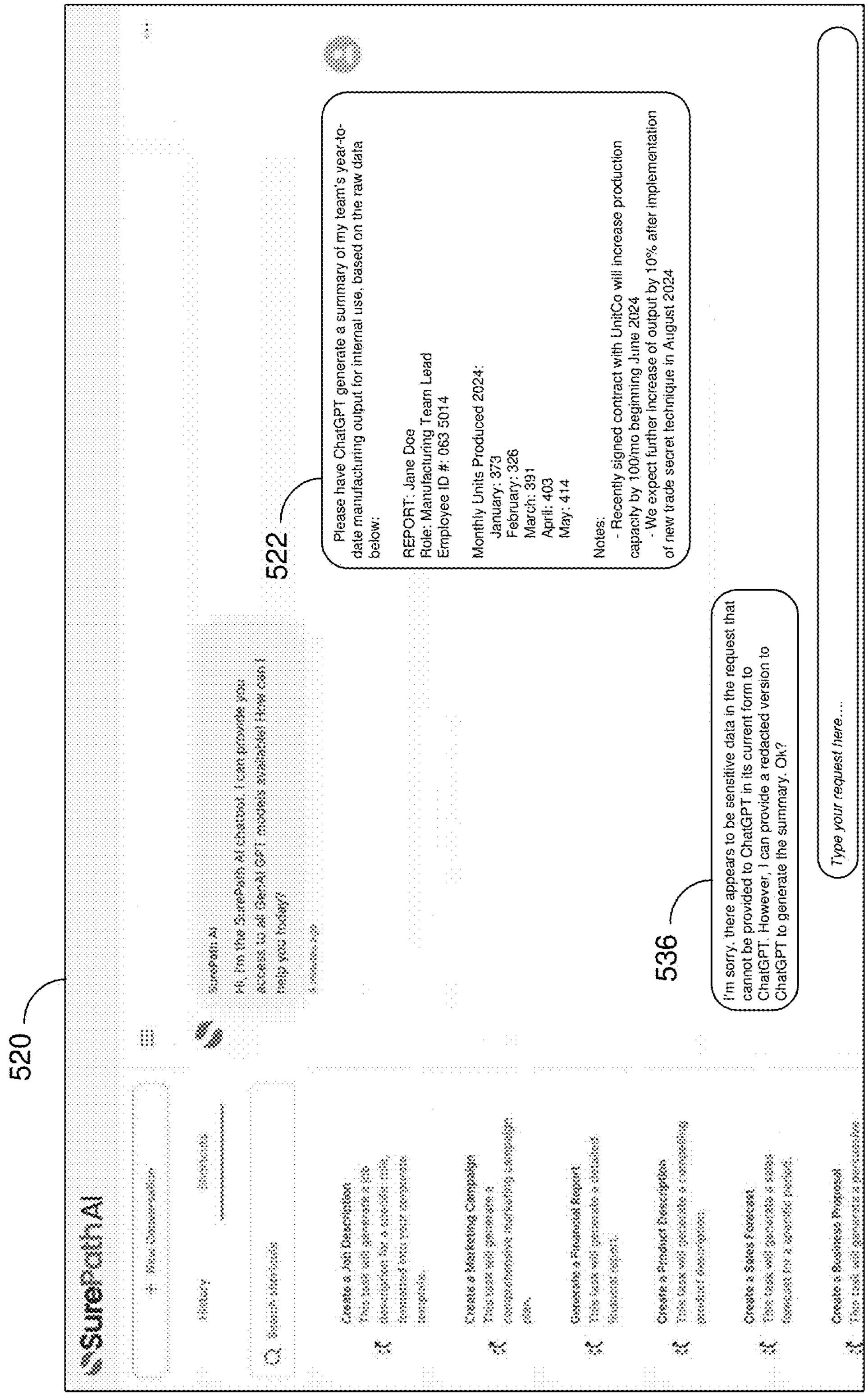
FIG. 5D depicts the GUI of FIG. 5B, further including a response to the request according to some embodiments.

As depicted in FIG. 5D, the GUI 520 is updated to include a response 536 by the chat assistant tool, indicating one or more security policies applied to the request 522 (e.g., based on determinations by the security policy enforcement engine 518). In this instance, the chat assistant can only provide the request to the intended network service if the request is redacted, e.g., to remove the portions indicated in FIG. 5C. In embodiments, the chat assistant prompts the user to accept the proposed redactions, or instead provide different instructions to the chat assistant tool.

FIG. 5E depicts an alternate, redacted version of the request 522 ("redacted request 538") generated via the data loss prevention engine 120 and directed to the intended network service using the techniques of this disclosure. In some embodiments, the GUI 520 may display the redacted request 538 to the user for viewing. In any case, the redacted request 538 removes sensitive portions of the request 522 while preserving the request such that the intended network service can generate desirable output.

Figure 5F:
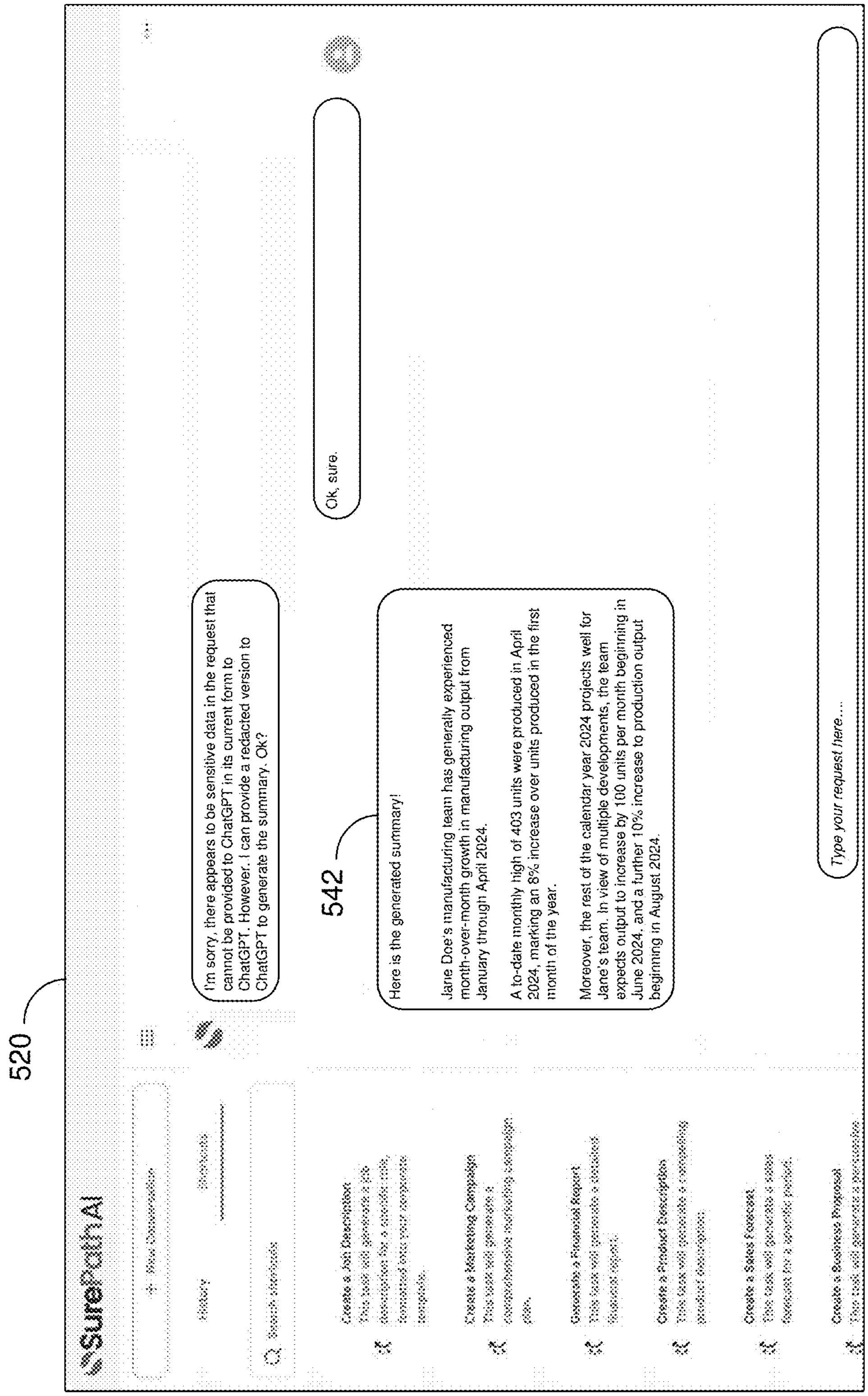
FIG. 5F depicts a GUI indicating a response to the request to the network service according to some embodiments.

FIG. 5F depicts the GUI 520 providing example output 542 of the intended network service based on the redacted request 538. The output 542 is substantively complete and reflective of the request 522 originally provided by the user, but does not include or reflect the identified sensitive data from the request 522.

Figure 5G:
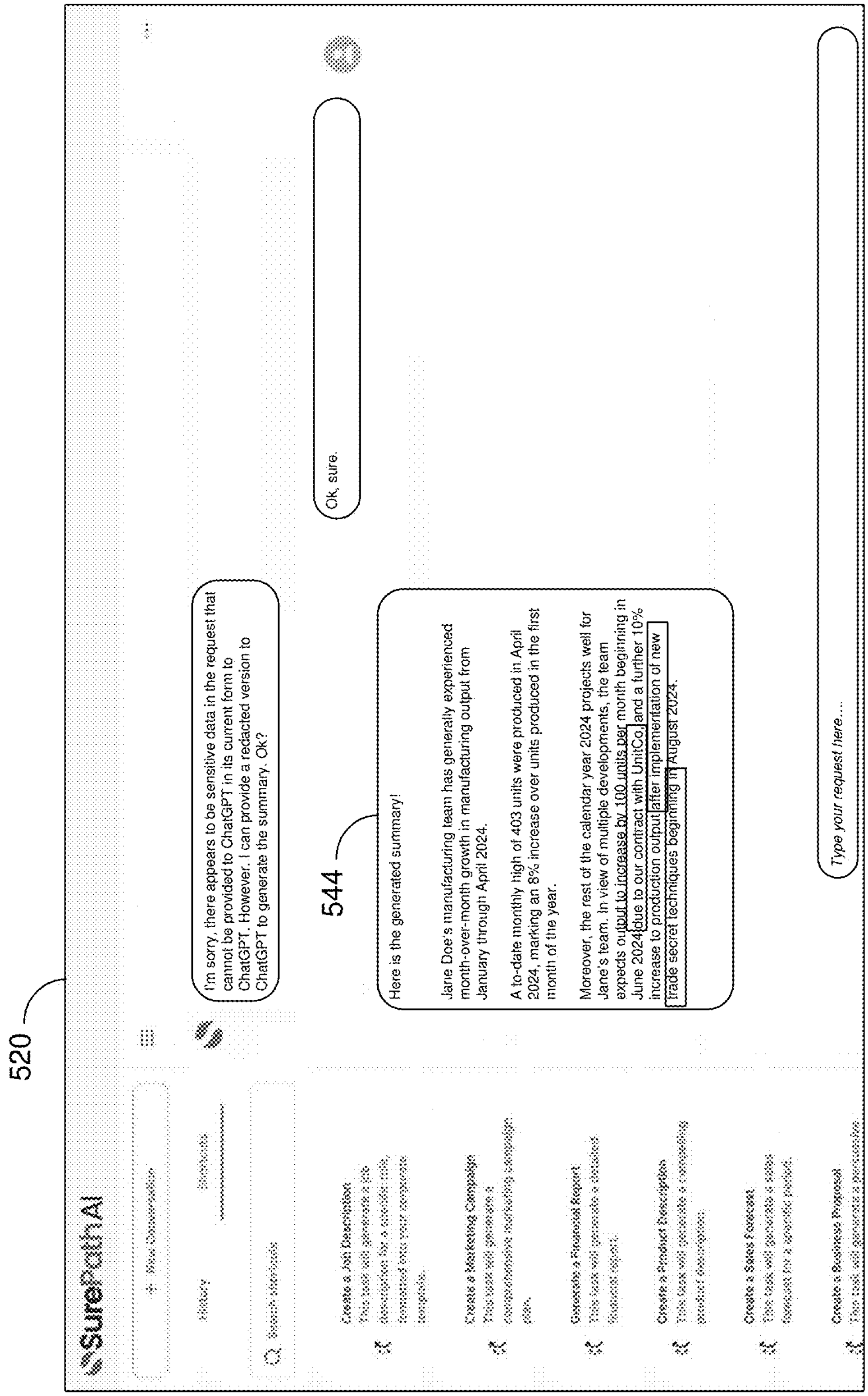
FIG. 5G depicts a modified GUI indicating a modified response to the request to the network service according to some embodiments.

In some embodiments, systems and methods of this disclosure may use network session data to store contents of the request 522 originally provided by the user, as well as indications of text redacted therefrom. This technique may enable the systems and methods to restore sensitive data redacted from the request provided to the network service, without the network service itself receiving the sensitive data. For example, as depicted in FIG. 5G, the GUI 520 may provide an unredacted response 544 generated by the data loss prevention engine 120. Specifically, the data loss prevention engine 120 may receive inbound network traffic generated by the intended network service, and parse the inbound network traffic based on the network session data to identify portions of the inbound network traffic that are affected by the redactions, and augment the inbound network traffic using the previously redacted information to generate an augmented dataset for provision to the user (e.g., the unredacted response 544). As depicted in FIG. 5G, boxes are shown to indicate where the previously redacted text is restored in the unredacted output 544.

Figure 5H:
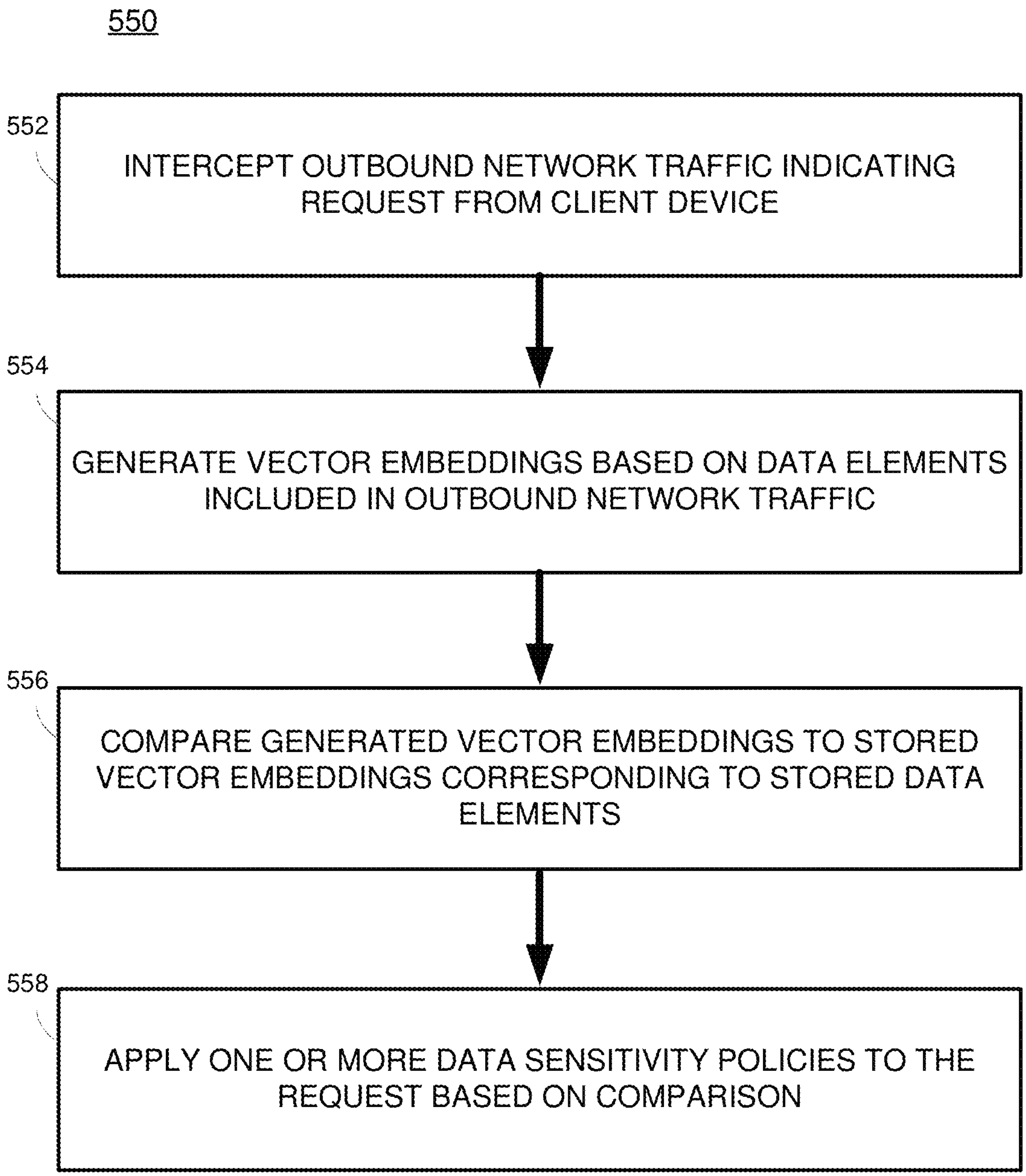
FIG. 5H is a flow diagram of another example method according to some embodiments.

FIG. 5H depicts a block diagram of an example method 550 associated with application of data sensitivity policies to a request to a network service. The method 550 may be performed, for example, by the enterprise data management and monitoring system 100, and particularly via aspects of the data loss prevention engine (alone and/or in combination with other aspects of the enterprise data management and monitoring system 100). Still more particularly, the method 550 may be performed via one or more processing units (e.g., one or more processing units 104 of FIG. 1A), which may execute computer executable instructions stored at one or more memories (e.g., the memory unit 106). In some embodiments, one or more non transitory computer readable media store instructions that, when executed via one or more processing units, cause the enterprise data management and monitoring system 100 to perform actions of the method 550. In some embodiments, at least some actions of the method 550 may be performed by a client device of an enterprise user (e.g., client device 126).

At a block 552, the method includes, via a network communication interface, intercepting outbound network traffic indicating a request to a network service from a client device. In some embodiments, the outbound network traffic indicates an intended network service(s) for the request.

At a block 554, the method further includes generating one or more vector embeddings based on respective ones of one or more data elements included in the outbound network traffic. Generating the one or more vector embeddings may include any of the various techniques described in this disclosure.

At a block 556, the method still further includes comparing the one or more generated vector embeddings to a stored plurality of vector embeddings to determine whether the outbound network traffic includes at least one of a plurality of stored data elements corresponding to respective ones of the stored plurality of data embeddings (e.g., the outbound network traffic explicitly includes the stored data element(s) or indicates the stored data element(s). The stored plurality of vector embeddings may be generated according to any of the various techniques described in this disclosure. In particular, though, each of the stored plurality of vector embeddings may define values in one or more dimensions via which the stored plurality of vector embeddings is compared to the generated one or more vector embeddings from the request. In embodiments, the method 556 further includes generating the plurality of vector embeddings in response to receiving respective indications of one or more data payloads generated via an enterprise.

At a block 558, the method still yet further includes applying one or more data sensitivity policies to the request to the network service based on whether the outbound network traffic includes at least one of the stored data elements. Applying the one or more data sensitivity policies may, for example, include selecting one or more approved network services for the request based on the one or more data sensitivity policies, and transmitting an outbound dataset at least one of the one or more approved network service to service the request. The approved network service(s) may include an intended network service associated with the request, and/or another network service(s). Transmitting the outbound dataset to the approved network service(s) may, for example, include transmitting at least a portion of the outbound network traffic. Additionally or alternatively, transmitting the outbound dataset may include transmitting data generated based on the (e.g., normalized, transformed, and/or redacted data).

The one or more applied data sensitivity policies may include any suitable one or more of various policies discussed in this disclosure, e.g., a policy defining (for example, approving, forbidding, or limiting) network service usage based on a date, time, client device associated with the request, identity of a user associated with the request, presence of certain other data in the request, etc. In some embodiments, the one or more data sensitivity policies include a policy configured to expire after a predetermined lifetime or upon receiving an indication of an occurrence of a particular event in an enterprise.

In various embodiments, the method 550 may include still additional, fewer, and/or alternate actions, including for example various actions described in this disclosure. Moreover, the order of actions of the method 550 may differ from the order depicted in FIG. 5H, in some embodiments.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules or engines of a computer system (e.g., a processor or a group of processors) may be configured by software (e.g., an application or application portion) as a hardware module that operates to perform certain operations as described herein.

In various embodiments, a hardware module or engine may be implemented mechanically or electronically. For example, a hardware module or engine may comprise dedicated circuitry or logic that is permanently configured (e.g., as a special-purpose processor, such as a field programmable gate array (FPGA) or an application-specific integrated circuit (ASIC)) to perform certain operations. A hardware module or engine may also comprise programmable logic or circuitry (e.g., as encompassed within a general-purpose processor or other programmable processor) that is temporarily configured by software to perform certain operations. It will be appreciated that the decision to implement a hardware module or engine mechanically, in dedicated and permanently configured circuitry, or in temporarily configured circuitry (e.g., configured by software) may be driven by cost and time considerations.

Accordingly, the terms "hardware module" and "engine" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules or engines are temporarily configured (e.g., programmed), each of the hardware modules or engines need not be configured or instantiated at any one instance in time. For example, where the hardware modules or engines include a general-purpose processor configured using software, the general-purpose processor may be configured as respective different hardware modules at different times. Software may accordingly configure a processor, for example, to constitute a particular hardware module or engine at one instance of time and to constitute a different hardware module or engine at a different instance of time.

Hardware modules or engines can provide information to, and receive information from, other hardware modules or engines. Accordingly, the described hardware modules or engines may be regarded as being communicatively coupled. Where multiple of such hardware modules or engines exist contemporaneously, communications may be achieved through signal transmission (e.g., over appropriate circuits and buses) that connect the hardware modules or engines. In embodiments in which multiple hardware modules or engines are configured or instantiated at different times, communications between such hardware modules or engines may be achieved, for example, through the storage and retrieval of information in memory structures to which the multiple hardware modules or engines have access. For example, one hardware module or engine may perform an operation and store the output of that operation in a memory device to which it is communicatively coupled. A further hardware module or engine may then, at a later time, access the memory device to retrieve and process the stored output. Hardware modules or engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules or engines referred to herein may, in some example embodiments, comprise processor-implemented modules or engines.

Similarly, the methods or routines described herein may be at least partially processor-implemented. For example, at least some of the operations of a method may be performed by one or more processors or processor-implemented hardware modules or engines. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules or engines may be located in a single geographic location (e.g., within a home environment, an office environment, or a server farm). In other example embodiments, the one or more processors or processor-implemented modules or engines may be distributed across a number of geographic locations.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. An Enterprise Data Management and Monitoring system, the system comprising:

a network communication interface configured to receive network traffic;

a processing unit; and a memory unit storing instructions for various engines that are executable by the processing unit, the various engines including a data policy enforcement engine that includes:

an intent detection engine configured to:

receive context data and content data relating to the network traffic; and generate an intent indexer for the network traffic based on the context data and the content data, the intent indexer documenting an operation request and a subject of the operation request that are connected to the network traffic, the subject comprising a target of the operation request identified from the content data; and an intent policy control engine configured to administer aspects of the network traffic based on the intent indexer and the context data by:

selecting a set of enforcement rules from among a plurality of different sets of enforcement rules based on the context data;

comparing the intent indexer to the selected set of enforcement rules to determine entries in the selected set of enforcement rules that match one or both of the subject and operation request included in the intent indexer, the selected set of enforcement rules defining a set of allowable operation requests and subjects, a set of allowable with modification operation requests and subjects, and a set of rejectable operation requests and subjects; and performing one or more network administration tasks on the network traffic based on the determined entries, the one or more network administration tasks including:

blocking further transmission of the network traffic when the determined entries are in the set of rejectable operation requests and subjects;

allowing further transmission of the network traffic when the determined entries are in the set of allowable operation requests and subjects; and modifying the network traffic when none of the determined entries are in the set of rejectable operation requests and at least one of the determined entries are in the set of allowable with modification operation requests and subjects.

2. The system of claim 1 wherein the intent detection engine is configured to:

assign an enterprise category to the network traffic based on context data and content data, wherein the intent indexer further documents the assigned enterprise category.

3. The system of claim 1, wherein the intent detection engine is further configured to:

input the context data and the content data into a first machine learning model;

receive a summary of the context data and the content data as an output of the first machine learning model; and generate the intent indexer from the summary.

4. The system of claim 3 wherein:

a predefined taxonomy of possible operations and/or subjects is stored in the memory unit; and the intent detection engine is configured to generate the intent indexer from the summary by:

identifying a nearest neighbor between the summary and entries in the predefined taxonomy, and selecting the nearest neighbor entries as the operation request and a subject of the operation request to include in the intent indexer.

5. The system of claim 3 wherein the intent detection engine is configured to generate the intent indexer from the summary by:

inputting the summary into a second machine learning model; and receiving the operation request and a subject of the operation request as output of the second machine learning model.

6. The system of claim 1, wherein the intent detection engine is further configured to:

input the context data and the content data into a first machine learning model; and receive the intent indexer as an output of the first machine learning model.

7. The system of claim 1, wherein modifying the network traffic includes selecting an approved destination for the network traffic that is different from an intended destination of the network traffic.

8. The system of claim 1, wherein modifying the network traffic includes modifying the content data into an approved variation thereof.

9. The system of claim 1 wherein the context data includes one or more of a role assigned to a user account linked to the network traffic, an intended network service for the network traffic, an indication of a registered client device associated with the network traffic, a location of the registered client device, and a time and date when the network traffic was initiated.

10. The system of claim 1 wherein the intent detection engine is configured to:

monitor the network traffic over time for changes in the context data and content data;

generating a revised intent indexer for the network traffic based on the changes in the context data and the content data, the revised intent indexer documenting a new operation request and/or a new subject of the new operation request that are connected to the network traffic.

11. The system of claim 1, wherein the intent policy control engine is configured to select the set of enforcement rules from among the plurality of different sets of enforcement rules based on one or more of a user account associated with the network traffic, a time of day, and an enterprise category of the intent indexer.

12. The system of claim 1, wherein blocking further transmission of the network traffic includes initiating display of a notification on a client device that the network traffic has been blocked.

13. A computer-implemented method of administering aspects of network traffic, the method comprising:

receiving network traffic via a network communication interface;

receiving context data and content data relating to the network traffic;

generating an intent indexer for the network traffic based on the context data and the content data, the intent indexer documenting an operation request and a subject of the operation request that are connected to the network traffic, the subject comprising a target of the operation request identified from the content data;

selecting a set of enforcement rules from among a plurality of different sets of enforcement rules based on the context data, the selected set of enforcement rules defining a set of allowable operation requests and subjects, a set of allowable with modification operation requests and subjects, and a set of rejectable operation requests and subjects;

comparing the intent indexer to the selected set of enforcement rules to determine entries in the selected set of enforcement rules that match one or both of the subject and operation request included in the intent indexer; and performing one or more network administration tasks on the network traffic based on the determined entries, the one or more network administration tasks including:

blocking further transmission of the network traffic when the determined entries are in the set of rejectable operation requests and subjects;

allowing further transmission of the network traffic when the determined entries are in the set of allowable operation requests and subjects; and modifying the network traffic when none of the determined entries are in the set of rejectable operation requests and at least one of the determined entries are in the set of allowable with modification operation requests and subjects.

14. The computer-implemented method of claim 13, further comprising:

inputting the context data and the content data into a first machine learning model;

receiving a summary of the context data and the content data as an output of the first machine learning model;

identifying a nearest neighbor between the summary and entries in a predefined taxonomy of possible operations and/or subjects, the nearest neighbor identifying the operation request and the subject of the operation from the predefined taxonomy of possible operations and/or subjects; and generating the intent indexer from the nearest neighbor.

15. The computer-implemented method of claim 13, wherein the set of enforcement rules is selected from among the plurality of different sets of enforcement rules based on one or more of a user account associated with the network traffic, a time of day, and an enterprise category assigned to the network traffic.

16. A tangible, non-transitory computer-readable medium storing instructions, that, when executed by one or more processors of a computer system, cause the computer system to:

receive network traffic via a network communication interface;

receive context data and content data relating to the network traffic;

generate an intent indexer for the network traffic based on the context data and the content data, the intent indexer documenting an operation request and a subject of the operation request that are connected to the network traffic, the subject comprising a target of the operation request identified from the content data; and administer aspects of the network traffic based on the intent indexer and the context data by:

selecting a set of enforcement rules from among a plurality of different sets of enforcement rules based on the context data;

comparing the intent indexer to the selected set of enforcement rules to determine entries in the selected set of enforcement rules that match one or both of the subject and operation request included in the intent indexer, the selected set of enforcement rules defining a set of allowable operation requests and subjects, a set of allowable with modification operation requests and subjects, and a set of rejectable operation requests and subjects; and performing one or more network administration tasks on the network traffic based on the determined entries, the one or more network administration tasks including:

blocking further transmission of the network traffic when the determined entries are in the set of rejectable operation requests and subjects:

allowing further transmission of the network traffic when the determined entries are in the set of allowable operation requests and subjects; and modifying the network traffic when none of the determined entries are in the set of rejectable operation requests and at least one of the determined entries are in the set of allowable with modification operation requests and subjects.

17. The tangible, non-transitory computer-readable medium of claim 16, wherein the instructions further cause the computer system to:

input the context data and the content data into a first machine learning model;

receive a summary of the context data and the content data as an output of the first machine learning model;

identify a nearest neighbor between the summary and entries in a predefined taxonomy of possible operations and/or subjects, the nearest neighbor identifying the operation request and the subject of the operation from the predefined taxonomy of possible operations and/or subjects; and generate the intent indexer from the nearest neighbor.

18. The tangible, non-transitory computer-readable medium of claim 16, wherein the set of enforcement rules is selected from among the plurality of different sets of enforcement rules based on one or more of a user account associated with the network traffic, a time of day, and an enterprise category assigned to the network traffic.

* * * * *